(12) United States Patent
Fujii et al.

(10) Patent No.: US 8,896,728 B2
(45) Date of Patent: Nov. 25, 2014

(54) IMAGE CAPTURING DEVICE AND IMAGE CAPTURING METHOD INCLUDING SETTING SHUTTER SPEED BASED ON BLUR AND NOISE

(75) Inventors: Takashi Fujii, Osaka (JP); Yusuke Monobe, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 337 days.

(21) Appl. No.: 13/522,342

(22) PCT Filed: Nov. 16, 2011

(86) PCT No.: PCT/JP2011/006374
§ 371 (c)(1),
(2), (4) Date: Jul. 16, 2012

(87) PCT Pub. No.: WO2012/066775
PCT Pub. Date: May 24, 2012

(65) Prior Publication Data
US 2012/0287310 A1 Nov. 15, 2012

(30) Foreign Application Priority Data
Nov. 18, 2010 (JP) ................................. 2010-257593

(51) Int. Cl.
*H04N 5/217* (2011.01)
*H04N 5/235* (2006.01)
*G03B 7/093* (2006.01)
*H04N 5/232* (2006.01)

(52) U.S. Cl.
CPC .............. *G03B 7/093* (2013.01); *H04N 5/2353* (2013.01); *H04N 5/23229* (2013.01); *H04N 5/2327* (2013.01); *G03B 2207/005* (2013.01)
USPC .......................................................... 348/241

(58) Field of Classification Search
USPC ....................... 348/241, 243, 296, 297, 222.1
See application file for complete search history.

(56) References Cited

U.S. PATENT DOCUMENTS 7,009,636 B2 * 3/2006 Liu et al. .................... 348/208.1
7,061,524 B2 * 6/2006 Liu et al. .................... 348/208.4
(Continued)

FOREIGN PATENT DOCUMENTS

| JP | 2003-259184 | 9/2003 |
| JP | 2009-008961 | 1/2009 |
| JP | 2009-152803 | 7/2009 |

OTHER PUBLICATIONS

European Search Report, issued Feb. 10, 2014 in European Application 11842443.1, which is a counterpart to the present application.

(Continued)

*Primary Examiner* — Nicholas Giles
(74) *Attorney, Agent, or Firm* — Wenderoth, Lind & Ponack, L.L.P.

(57) ABSTRACT

An image capturing device which continuously captures images having high sensitivity and high resolution and synthesizes the continuously-captures images when lighting is very dark or when a luminance value of an object is small, the image capturing device including: an image capturing unit which receives light from the object and generates an image in which the object is captured; a continuously-captured-image synthesizing unit which generates a synthesized continuously-captured image in which the object is captured, by synthesizing two or more images temporally continuously captured by the image capturing unit; and a parameter setting unit which sets a shutter speed at which each of the two or more images is captured, according to the luminance value of the object and a speed of the object.

12 Claims, 17 Drawing Sheets

(56) References Cited

U.S. PATENT DOCUMENTS

| | | | |
|---|---|---|---|
| 8,134,628 B2* | 3/2012 | Border et al. | 348/311 |
| 8,144,220 B2* | 3/2012 | Border et al. | 348/241 |
| 8,149,303 B2* | 4/2012 | Border et al. | 348/243 |
| 8,194,164 B2* | 6/2012 | Border et al. | 348/311 |
| 8,194,165 B2* | 6/2012 | Border et al. | 348/317 |
| 8,194,166 B2* | 6/2012 | Border et al. | 348/320 |
| 8,279,316 B2* | 10/2012 | Border et al. | 348/311 |
| 8,279,317 B2* | 10/2012 | Border et al. | 348/322 |
| 8,294,803 B2* | 10/2012 | Border et al. | 348/317 |
| 8,294,812 B2* | 10/2012 | Okada et al. | 348/362 |
| 8,314,873 B2* | 11/2012 | Border et al. | 348/311 |
| 8,570,389 B2* | 10/2013 | Sorek et al. | 348/222.1 |
| 2003/0095189 A1* | 5/2003 | Liu et al. | 348/208.4 |
| 2003/0098919 A1* | 5/2003 | Liu et al. | 348/297 |
| 2009/0161913 A1 | 6/2009 | Son | |
| 2010/0026839 A1* | 2/2010 | Border et al. | 348/231.2 |
| 2010/0033602 A1* | 2/2010 | Okada et al. | 348/241 |
| 2010/0053346 A1* | 3/2010 | Mitsunaga | 348/208.6 |
| 2010/0053349 A1 | 3/2010 | Watanabe et al. | |
| 2011/0074980 A1* | 3/2011 | Border et al. | 348/241 |
| 2011/0074981 A1* | 3/2011 | Border et al. | 348/241 |
| 2011/0074997 A1* | 3/2011 | Border et al. | 348/311 |
| 2011/0074998 A1* | 3/2011 | Border et al. | 348/311 |
| 2011/0074999 A1* | 3/2011 | Border et al. | 348/311 |
| 2011/0075000 A1* | 3/2011 | Border et al. | 348/311 |
| 2011/0075001 A1* | 3/2011 | Border et al. | 348/311 |
| 2011/0075006 A1* | 3/2011 | Border et al. | 348/317 |
| 2011/0075007 A1* | 3/2011 | Border et al. | 348/317 |
| 2011/0075008 A1* | 3/2011 | Border et al. | 348/317 |
| 2011/0075009 A1* | 3/2011 | Border et al. | 348/317 |
| 2011/0075010 A1* | 3/2011 | Border et al. | 348/317 |
| 2011/0216210 A1* | 9/2011 | Hao | 348/222.1 |
| 2014/0218553 A1* | 8/2014 | Deever | 348/218.1 |

OTHER PUBLICATIONS

International Search Report issued Feb. 21, 2012 in International (PCT) Application No. PCT/JP2011/006374.

* cited by examiner

FIG. 6

IMAGE CAPTURING DEVICE AND IMAGE CAPTURING METHOD INCLUDING SETTING SHUTTER SPEED BASED ON BLUR AND NOISE

TECHNICAL FIELD

The present invention relates to a technique for capturing an image of an object with high sensitivity and high resolution in the field of digital still cameras, digital video cameras, network cameras, security cameras, and so on.

BACKGROUND ART

In recent years, the number of pixels in image sensors of digital cameras, video cameras, and so on has increased, which has led to an increase in resolution of images captured by the image sensors. However, such increase in the number of pixels causes reduction in the amount of light received per pixel, resulting in a problem of much noise in the captured images.

In order to suppress the noise caused by the reduced amount of light received and to capture images with a high sensitivity and a high resolution, conventional cameras have employed the technique of continuously capturing a plurality of images and synthesizing the continuously-captured images into one image.

With such continuous capturing of images and synthesizing of the continuously-captured images, images (continuously-captured images) are captured with a shutter speed at which the exposure time is relatively short, and then the continuously-captured images are aligned and synthesized, so that the resolution is maintained and the noise is reduced. Thus, although the amount of light received is reduced, it is possible to maintain the small amount of noise and the high level of resolution.

A technique of appropriately setting camera parameters in such continuous capturing of images and synthesizing of the continuously-captured images is disclosed.

An example of such parameter setting technique is, as disclosed in Patent Literature 1, to set a shutter speed which is fast enough to make it insusceptible to hand shaking, and to control, according to the luminance of the object, the sensitivity and the number of images to be captured, to thereby generate a synthesized image having a high resolution and a high sensitivity from an appropriate number of continuously-captured images.

CITATION LIST

Patent Literature

[PTL 1] Japanese Unexamined Patent Application Publication No. 2009-152803

SUMMARY OF INVENTION

Technical Problem

However, with typical continuous capturing of images and synthesizing of the continuously-captured images, a shutter speed is set faster than a normal shutter speed when the speed of the object is fast and the blur amount is large.

Thus, the exposure time per continuously-captured image is, not a relatively long first time length, but a relatively short second time length, which means a decrease in the exposure time.

There is a case of performing the continuous capturing of images and synthesizing of the continuously-captured images in the normal lighting environment (relatively bright lighting environment).

In such a case, even when the exposure time per continuously-captured image is set to the relatively short second time length, random noise such as light shot noise dominates as the noise in the continuously-captured images, and every time the continuously-captured images are overlaid with one another, it is possible to reduce the noise and generate an adequate, synthesized continuously-captured image having a high sensitivity and a high resolution.

However, there is a case of performing the continuous capturing of images and synthesizing of the continuously-captured images in a very dark lighting environment (relatively dark lighting environment).

In such a case, fixed-pattern noise such as dark current noise becomes dominant noise in the continuously-captured images obtained in the continuous capturing of images and synthesizing of the continuously-captured images. Note that there is an environment where the lighting is relatively dark for an object in an image region which is included in a part of continuously-captured images and has a small luminance value. In such a case where the fixed pattern noise appears in a large amount and thus becomes dominant noise, there is a problem of difficulty in reducing the noise even when the sensitivity and the number of images to be captured are controlled for synthesizing the continuously-captured images as in Patent Literature 1.

The present invention is to solve the above conventional problem, and it is an object of the present invention to provide an image capturing device which performs continuous capturing of images and synthesizing of the continuously-captured images to generate an image having a high sensitivity and a high resolution even when the speed of the object is fast and the blur amount is large, even when the lighting is very dark, or even when the luminance value of the object is small.

Solution to Problem

In order to solve the conventional problem, an image capturing device according to an aspect of the present invention includes: an image capturing unit which receives light from an object and generates an image in which the object is captured; a continuously-captured-image synthesizing unit which generates a synthesized continuously-captured image in which the object is captured, by synthesizing two or more images temporally continuously captured by the image capturing unit; and a parameter setting unit which sets a shutter speed at which each of the two or more images is captured, according to a luminance value of the object and a speed of the object.

Note that for example, the parameter setting unit sets the shutter speed and the number of images to be captured, according to the luminance value of the object and the speed of the object. In other words, among the setting of the luminance value of the object, the speed of the object, the shutter speed, and the number of images to be captured, the setting of the luminance value of the object and the speed of the object is not made by the parameter setting unit. On the other hand, the setting of the shutter speed and the number of images to be captured is made by the parameter setting unit.

Advantageous Effects of Invention

With the image capturing device according to an aspect of the present invention, it is possible to capture an image having a high sensitivity and a high resolution even when the speed of the object is fast and the blur amount is large, even when the lighting is very dark, or even when the luminance value of the object is small.

BRIEF DESCRIPTION OF DRAWINGS

FIG. 6 is an explanatory diagram of a relationship between a resolution and a noise amount dependent on a pair of a shutter speed and the number of images to be continuously captured.

DESCRIPTION OF EMBODIMENTS

Figure 1:
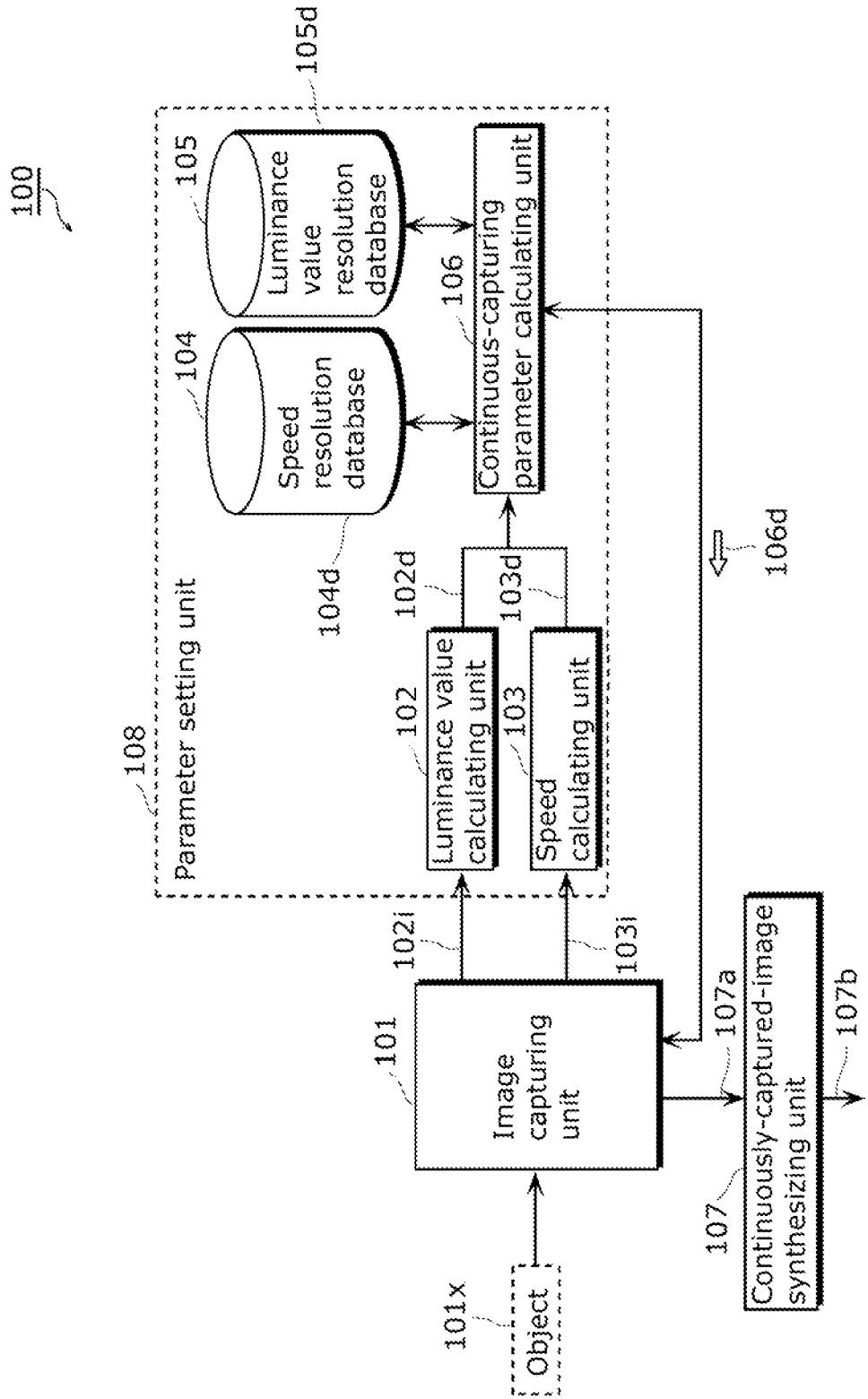
FIG. 1 shows a configuration of an image capturing device according to Embodiments 1, 2, and 3 of the present invention.

Hereinafter, embodiments of the present invention will be described with accompanying drawings. Note that the embodiments described below are preferable, specific examples of the present invention. The numeric values, shapes, materials, structural elements, the arrangement and connection of the structural elements, steps, the processing order of the steps, and so on shown in the following embodiments are given by way of example and are not intended to limit the present invention. That is to say, the present invention is limited only by the claims. Therefore, among the structural elements described in the embodiments below, those not recited in the independent claims defining the most generic concept of the present invention are not essential for overcoming conventional disadvantages, but are described as preferable structural elements.

An image capturing device 100 according to the embodiments includes: an image capturing unit (image sensor unit 203) which receives light 101L from an object 101x and generates an image in which the object 101x is captured (e.g. image 92a); a continuously-captured-image synthesizing unit 107 which generates a synthesized continuously-captured image in which the object 101x is captured (an image 93a generated from a plurality of images 92a), by synthesizing two or more images temporally continuously captured by the image capturing unit; and a parameter setting unit 205 which sets a shutter speed (exposure time) at which each of the two or more images is captured, according to a luminance value of the object 101x (a first luminance level indicated in information 205a) and a speed of the object 101x (a first movement indicated in information 205v).

With this, setting is made not only according to a first resolution (dashed line in FIG. 9) which is an upper limit of the resolution of a synthesized continuously-captured image to be generated and is determined based on a second movement that is a movement obtained by making the first movement during the exposure time. That is to say, the setting is made according also to a second resolution (solid line in FIG. 9) which is an upper limit of the resolution of the synthesized continuously-captured image to be generated and is determined based on a second luminance level which is, for example, a product of the first luminance level and the length of the exposure time. The setting is made according to the first resolution (dashed line) and the second resolution (solid line). With this, when the shutter speed is set to a shutter speed (e.g. shutter speed L1 in FIG. 9) at which the first resolution (dashed line) is higher than or equal to a threshold (e.g. value X3 in FIG. 9) whereas the second resolution (solid line) is lower than the threshold, it is possible to prevent a decrease in the resolution (image quality) of a synthesized continuously-captured image to be generated. When the shutter speed is set to a shutter speed (e.g. shutter speed L2) at which the second resolution (solid line) is also higher than or equal to the threshold, it is possible to increase the resolution of the synthesized continuously-captured image to be generated.

Moreover, the setting is made according to the second movement identified from the speed (the first movement) of the object 101x and the exposure time. Thus, not only when the speed of the object 101x is a normal speed but also when the speed of the object 101x is a relatively fast speed, an exposure time appropriate for that fast speed is set and thus the resolution (image quality) of the synthesized continuously-captured image to be generated can be increased. Furthermore, as described above, the setting is made according to the second luminance level identified from the first luminance level and the exposure time. Thus, not only in a normal lighting environment in which the first luminance level (luminance value) of the object 101x is normal but also in a very dark environment in which the first luminance level is lower, an exposure time appropriate for that environment is set and thus the image quality can be increased.

Embodiment 1

Generally, as disclosed in Patent Literature 1, in the case of performing the continuous capturing of images and synthesizing of the continuously-captured images for the purpose of blur correction, it is possible to set an optimal shutter speed and an optimal number of images to be continuously captured, which are independent of the total exposure time.

Therefore, in such a case, it is unnecessary to preset the total exposure time to a fixed length of time.

However, in the case where the camera itself is fixed and the object moves fast (as in the case of a security camera, for example), it is necessary to generate a synthesized continuously-captured image having a higher resolution from images captured within a limited time length.

Thus, it can be assumed that the user presets the total exposure time to a desired length of time according to the status and purpose of use.

In order to generate a synthesized continuously-captured image having a high sensitivity and a high resolution, an image capturing device according to Embodiment 1 determines, using a pair of a luminance value and a speed of an object, a pair of a shutter speed and the number of images to be continuously captured, which is optimal for performing, with the total exposure time set by the user, the continuous capturing of images and synthesizing of the continuously-captured images.

Note that the total exposure time is the product of the shutter speed and the number of images to be continuously captured.

FIG. 1 shows a configuration of an image capturing device 100 according to Embodiment 1 of the present invention.

Figure 2:
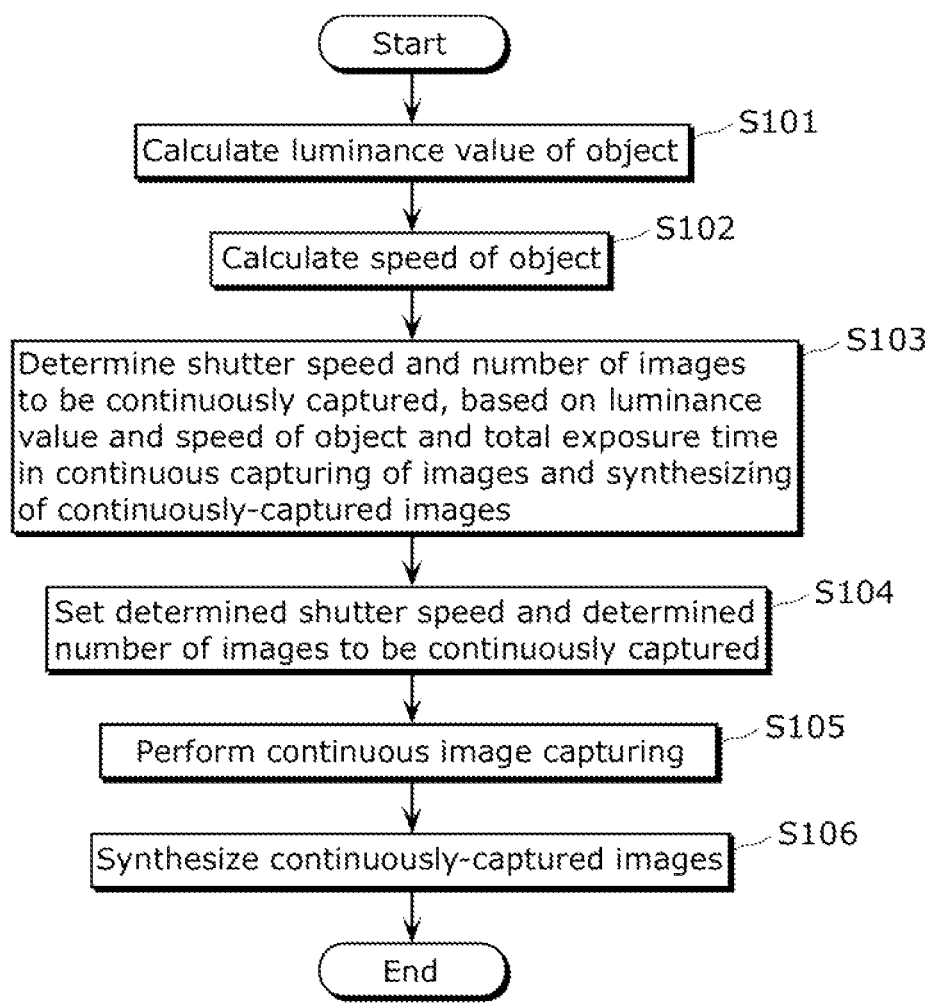
FIG. 2 is a flowchart of an image capturing device according to Embodiments 1, 2, and 3 of the present invention.

FIG. 2 is a flowchart showing a process of the image capturing device 100 as a whole.

A description will be provided below using FIGS. 1 and 2.

As shown in FIG. 1, the image capturing device 100 according to Embodiment 1 of the present invention includes an image capturing unit 101, a continuously-captured-image synthesizing unit 107, and a parameter setting unit 108.

The parameter setting unit 108 includes a luminance value calculating unit 102, a speed calculating unit 103, a speed resolution database 104, a luminance value resolution database 105, and a continuous-capturing parameter calculating unit 106.

Next, using FIG. 2, a process of the image capturing device 100 according to Embodiment 1 of the present invention will be described.

In Step S101, the luminance value calculating unit 102 calculates a luminance value (data 102d) of an object (e.g. object 101x in FIG. 1).

In Step S102, the speed calculating unit 103 calculates a speed (data 103d) of the object.

In Step S103, using the luminance value and the speed of the object calculated in Steps S101 and S102, respectively, and a total exposure time (described later) in the continuous capturing of images and synthesizing of the continuously-captured images, the continuous-capturing parameter calculating unit 106 determines a shutter speed and the number of images to be continuously captured (number of images to be captured by continuous capturing).

Figure 17:
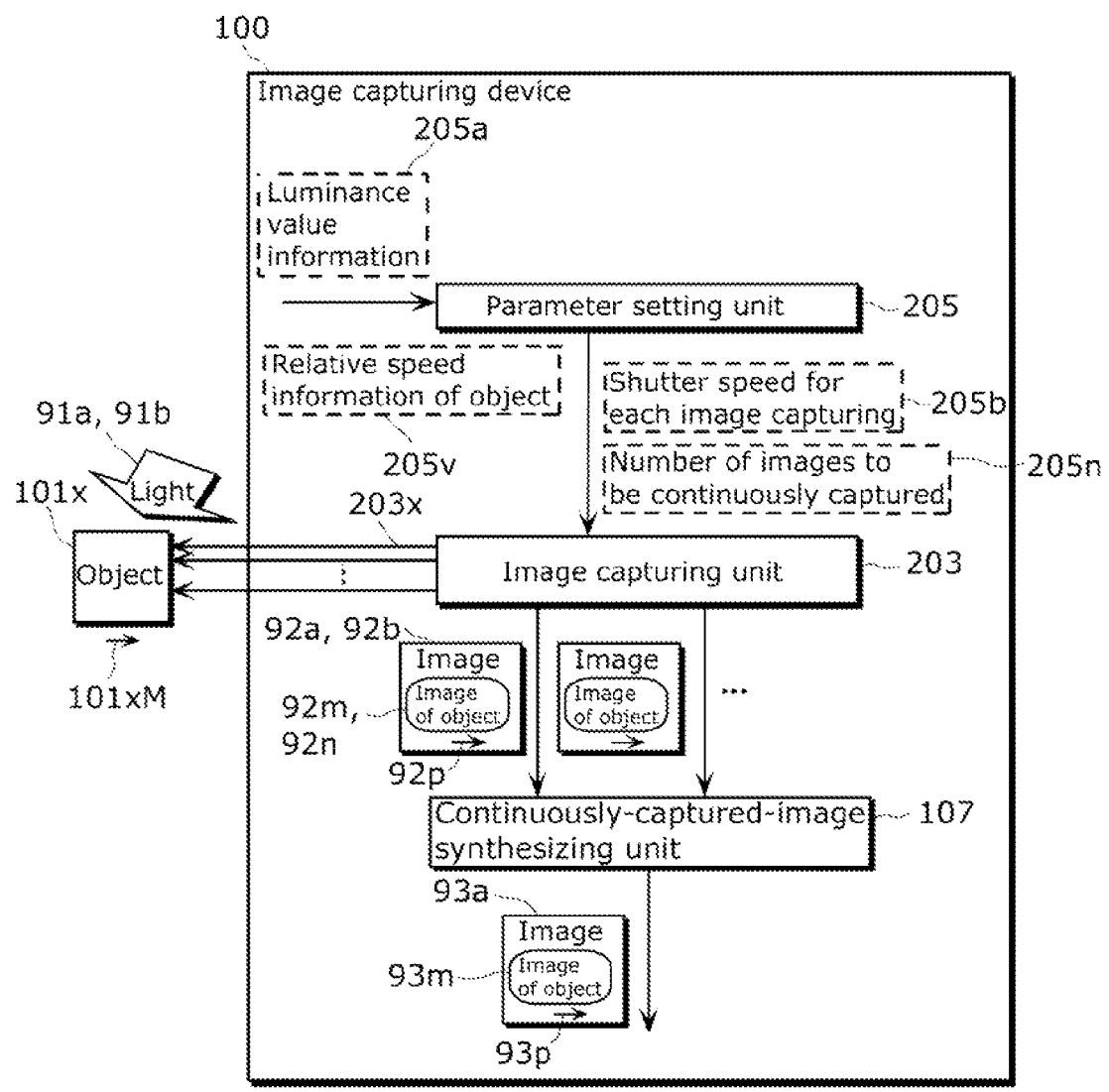
FIG. 17 shows an image capturing device according to Embodiment 1 of the present invention.

Note that a parameter setting unit 205 in FIG. 17 may be, for example, part of the parameter setting unit 108 in FIG. 1. The parameter setting unit 205 may be, for example, part of the parameter setting unit 108 including the continuous-capturing parameter calculating unit 106 but not including the luminance value calculating unit 102 and the speed calculating unit 103 in FIG. 1.

Note that in the determination of the parameters (such as a shutter speed and the number of images to be continuously captured) in Step S103, camera-related data such as a lens and an f number of the image capturing unit 101 and the number of pixels of an image sensor of the image capturing unit 101 may be used to improve the accuracy of the parameters to be determined.

In Step S104, the continuous-capturing parameter calculating unit 106 sets in the image capturing unit 101 the parameters determined in Step S103.

In Step S105, the image capturing unit 101 continuously captures images using the parameters (such as the shutter speed and the number of images to be continuously captured) which have been set in the image capturing unit 101 in Step S104.

In Step S106, the continuously-captured-image synthesizing unit 107 generates a synthesized continuously-captured image (image 107b) from the continuously-captured images (images 107a) obtained in Step S105.

Next, each structural element included in the image capturing device 100 will be described in more details.

The image capturing unit 101 continuously captures images using camera parameters (such as a shutter speed and the number of images to be continuously captured) determined by the continuous-capturing parameter calculating unit 106, and outputs the continuously-captured images. Furthermore, the image capturing unit 101 outputs data necessary for continuous-capturing parameter calculation (see S101 and S102) which is to be performed after the output of the continuously-captured images.

Figure 3:
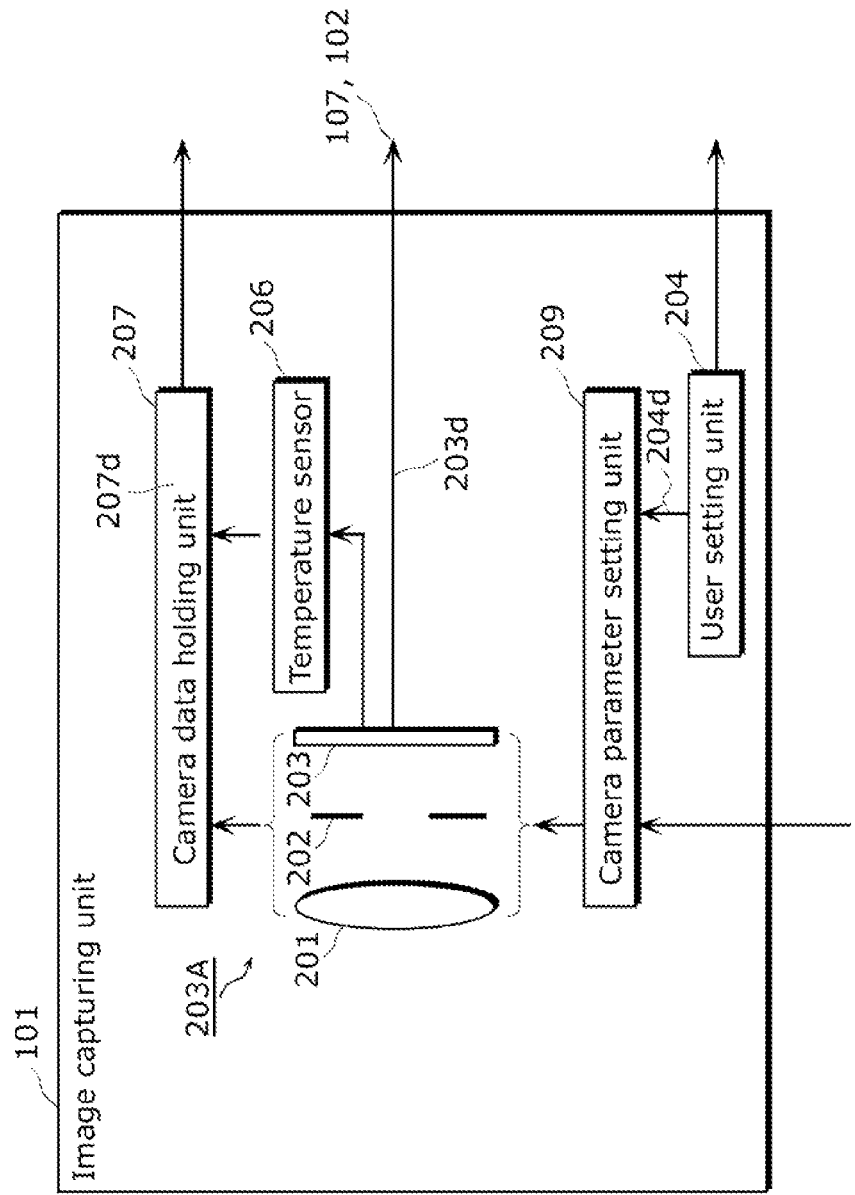
FIG. 3 shows a configuration of an image capturing unit according to Embodiments 1, 2, 3, and 4 of the present invention.

FIG. 3 shows a configuration of the image capturing unit 101.

Using FIG. 3, each structural element of the image capturing unit 101 will be described below.

Light emitted from the object 101x passes through a lens 201 and a diaphragm 202 and is received by an imaging sensor unit (image capturing unit) 203. The image sensor unit 203 converts the light into image data (data 203d), in the form of a digital signal, of the object 101x.

According to a parameter set by a camera parameter setting unit 209, the lens 201, the diaphragm 202, and the image sensor unit 203 (which form a processing unit 203A) change values of, for example, a focal length, an f number, a sensitivity, a shutter speed, and the number of images to be continuously captured, which are set in the processing unit 203A.

The image sensor unit 203 outputs image data of temporally continuous images to the continuously-captured-image synthesizing unit 107 (FIG. 1). Such image data is outputted also to the luminance value calculating unit 102 (FIG. 1) to be used by the luminance value calculating unit 102 for calculating the luminance value of the object.

A user setting unit 204 reads general camera parameters set by a user, such as a focal length, an f number, a sensitivity, and a shutter speed (data 204d). The user setting unit 204 then outputs the read camera parameters to the camera parameter setting unit 209.

Furthermore, the user setting unit 204 reads the total exposure time of a synthesized continuously-captured image, an object (e.g. face, car), a region of the object (e.g. the entire image, part of the image), and an object status (e.g. pre-measured speed, distance, illuminance, and luminance value of the object) which are settings made by the user. The user setting unit 204 then outputs such settings to the luminance value calculating unit 102, the speed calculating unit 103, and the continuous-capturing parameter calculating unit 106. In the case where the user sets a priority item from among items of the calculation amount, the resolution, and the sensitivity of the continuous capturing of images and synthesizing of the continuously-captured images, the user setting unit 204 reads that priority item and outputs to the continuous-capturing parameter calculating unit 106.

The camera parameter setting unit 209 reflects, in the lens 201, the diaphragm 202, and the image sensor unit 203, the general camera parameters set by the user setting unit 204, such as a focal length, an f number, a sensitivity, and a shutter speed. Note that to reflect a camera parameter is, for example, to control the position and so on of the lens 201. The camera parameter setting unit 209 also reflects, in the image sensor unit 203, the shutter speed and the number of images to be continuously captured, which have been determined by the continuous-capturing parameter calculating unit 106. In other words, control is performed so that each of the images in the determined number of images to be continuously captured is captured at the determined shutter speed, for example.

A camera data holding unit 207 holds data. The held data may include, for example, the identification numbers of the lens 201, the diaphragm 202, and the image sensor unit 203 which are currently mounted in the image capturing device 100. Furthermore, the data may include a modulation transfer function (MTF) of the lens 201 which is appropriate for an imaged height and an f number. Moreover, the data may include the number of pixels of the image sensor unit 203, temperature data of the image sensor unit 203 obtained by a temperature sensor 206, and the like.

The camera data holding unit 207 holds data on the general camera parameters that are currently set, such as a focal length, an f number, a sensitivity, and a shutter speed. Each piece of the held data is outputted to the luminance value calculating unit 102, the speed calculating unit 103, and the continuous-capturing parameter calculating unit 106.

The luminance value calculating unit 102 (FIG. 1) calculates a luminance value of the object (data 102*d*, luminance value information 205*a* in FIG. 17) from the data (data 102*i*) outputted by the image capturing unit 101, and outputs the calculated luminance value to the continuous-capturing parameter calculating unit 106 (FIG. 1).

Presuming, as an example, that the region of the object is the entire (approximately entire) image in the image data obtained from the image capturing unit 101, a method for calculating a luminance value from the entire image will be described.

First, the luminance value calculating unit 102 calculates a representative luminance value from the entire image data.

Note that as the representative luminance value to be calculated, an average value of the entire image data, a minimum value or a maximum value of the image data, and the like can be used, for example.

Next, the luminance value calculating unit 102 normalizes the calculated representative luminance value to a luminance value at a given shutter speed and sensitivity.

Note that the shutter speed increases by a factor of 8 and the sensitivity decreases by a factor of ¼ when the representative luminance value of the object captured at the currently set shutter speed ⅛ (sec) and the currently set sensitivity ISO 400 is to be normalized to a value at a shutter speed 1 (sec) and a sensitivity ISO 100, for example. Thus, the normalized luminance value can be calculated by multiplying by 2 (8×(¼)=2).

Note that such normalization is performed so that the luminance value used by the continuous-capturing parameter calculating unit 106 becomes a value independent of the camera parameters.

Note that as the luminance value of the object, a luminance value may be used which is calculated based on data set by the user setting unit 204, such as pre-measured illuminance and luminance value of the object.

For example, the user setting unit 204 may set an object illuminance measured with an illuminometer. Then, using a table associating illuminances with luminance values, the luminance value calculating unit 102 can also determine the luminance value of the object as a luminance value associated with the set illuminance in the table.

The speed calculating unit 103 (FIG. 1) calculates a speed of the object (data 103*d*, relative speed information 205*v* in FIG. 17) from the data (data 103*i*) outputted by the image capturing unit 101, and outputs the calculated speed to the continuous-capturing parameter calculating unit 106.

Note that as the speed data outputted in this manner, the number of pixels by which the image of the object moves in one second (pixel/sec) and the like may be used.

A specific example of such a process of calculating the speed of the object is, in the case where the object image is blurred due to hand shaking, a process of calculating the speed of hand shaking using the focal length (mm) outputted from the camera data holding unit 207.

It is generally said that a blur effect is not likely to arise from hand shaking when the shutter speed is set to 1/focal length (sec). From this, as data appropriate as data indicating the speed of hand shaking, a focal length (pixel/sec) can be calculated in many of expected cases.

Moreover, in the case where the user setting unit 204 sets a moving object such as a face and a car as the object, it is possible to calculate the speed of the object from the difference between a position of the object in a previous frame and a position of the object in the current frame.

Note that as the speed of the object, a speed may be used which is calculated based on pre-measured data set by the user setting unit 204 (such as data related to the speed and distance of the object). For example, in the case where a car is captured as the object, the user sets, via the user setting unit 204, the car speed measured with a speed measuring instrument. Then, a distance calculated using a positional relationship between the camera and the road which the car passes is set. From the speed and distance of the car and the focal length which are set in the above manner, it is possible to determine the above-described number of pixels, i.e. the speed of the car, for the image captured by the camera.

The speed resolution database 104 (FIG. 1) stores data (data 104*d*) indicating a relationship between a resolution and a blur amount dependent on the speed of the object.

The faster the speed of the object, or, the slower the shutter speed, the larger the blur amount of the object and the lower the resolution.

Figure 4:
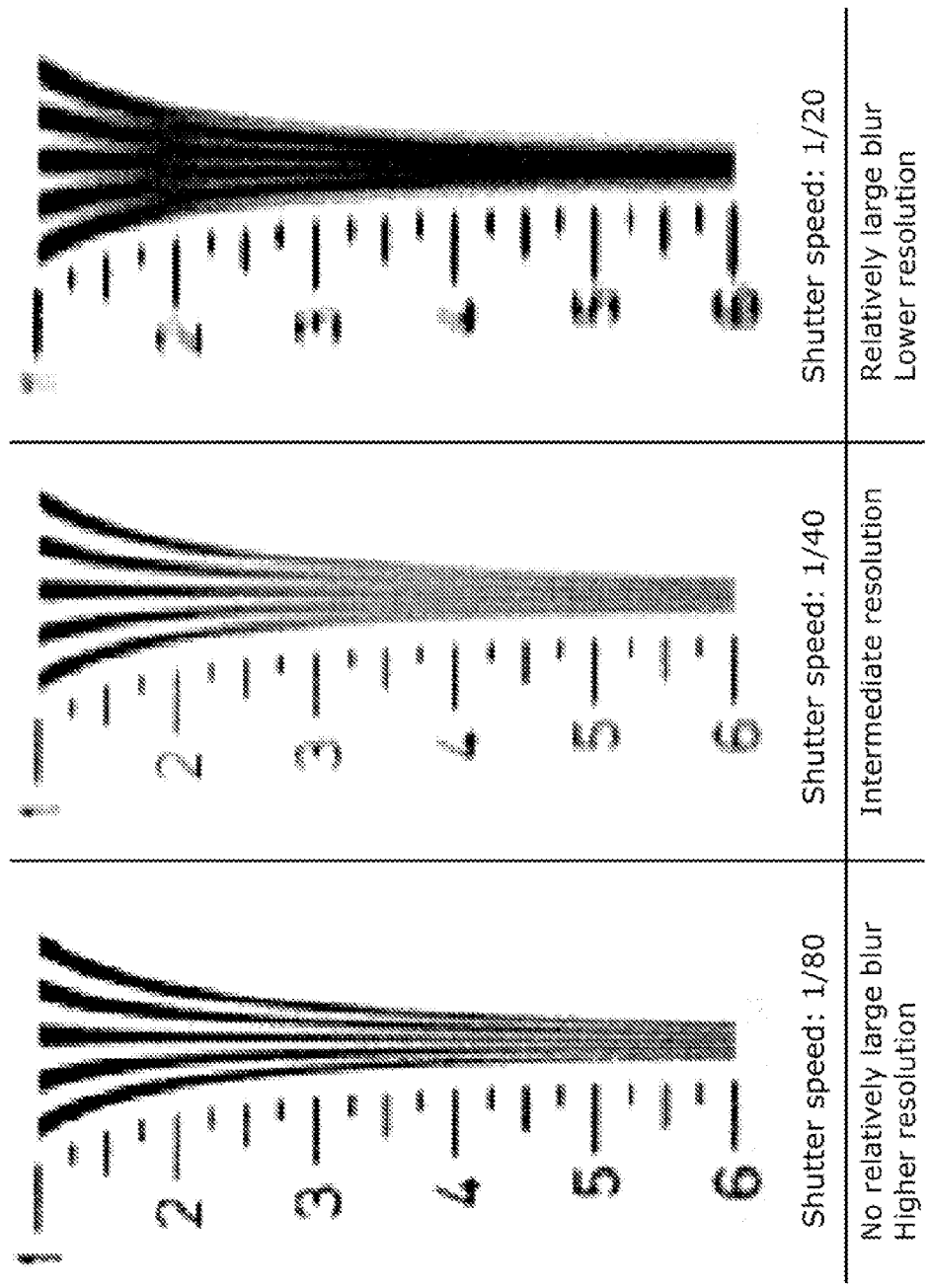
FIG. 4 is an explanatory diagram of a relationship between a resolution and a blur amount dependent on a shutter speed.

FIG. 4 shows images obtained by capturing a wedge portion of a resolution chart (ISO 12233) moving at an object speed Y. More specifically, each of the three images in FIG. 4, i.e. the image in the left column, the image in the middle column, and the image in the right column, is an image captured at a shutter speed different from the shutter speeds at which the other images have been captured.

It is apparent that the visually-checkable resolution is higher in the case of a relatively fast shutter speed 1/80 (sec) (left column).

It is also apparent that the visually-checkable resolution is lower in the case of a slower shutter speed 1/20 (sec) (right column), because the resolution chart is blurred.

Figure 5:
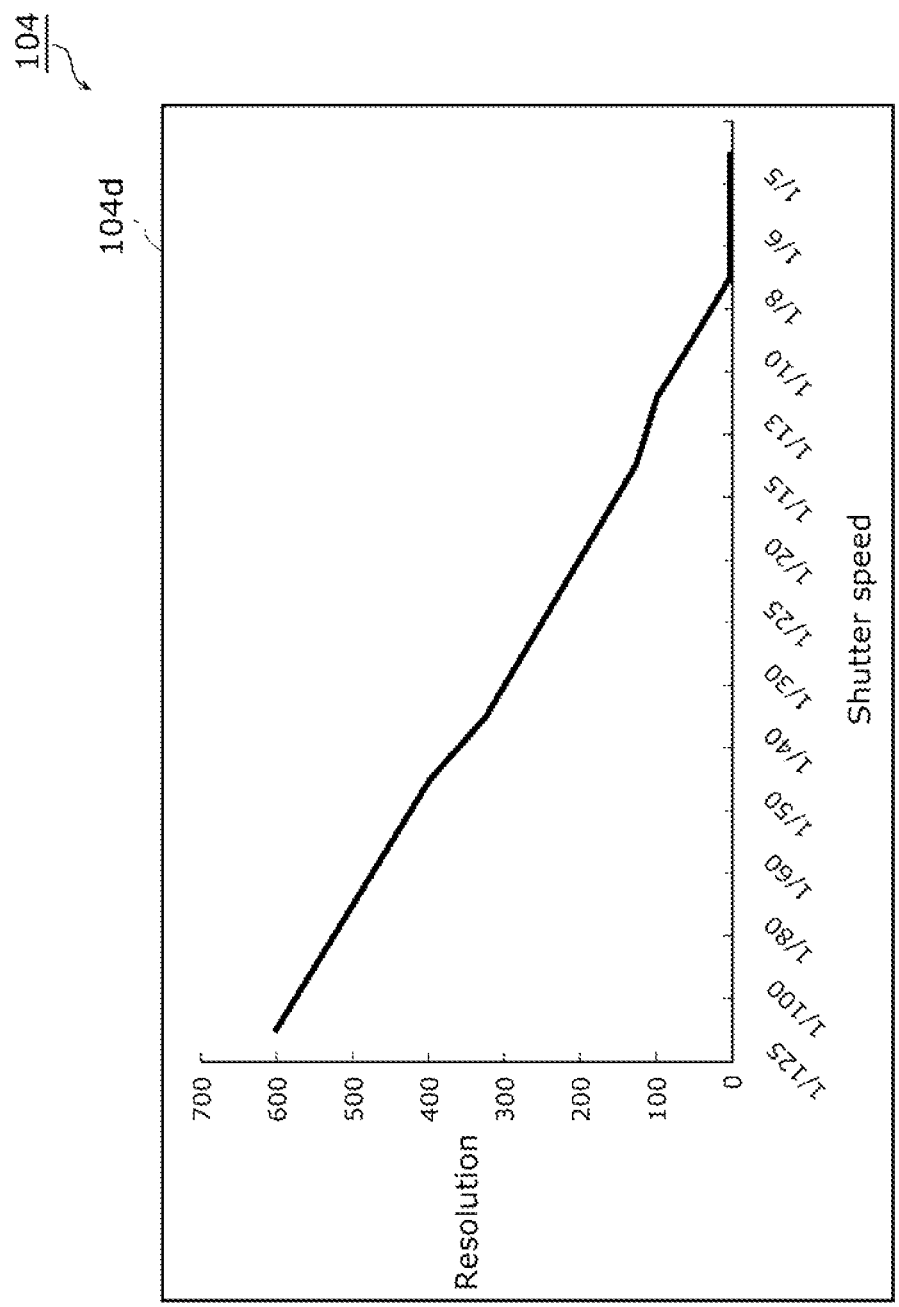
FIG. 5 shows a table of blur amounts and resolutions which is stored in a speed resolution database according to Embodiments 1, 2, and 3 of the present invention.

FIG. 5 is a graph showing such a relationship between the shutter speed and the resolution at the object speed Y.

The resolution on the vertical axis in FIG. 5 is the value of resolution (the number of lines) visually checked from the resolution chart which has been captured at each shutter speed (horizontal axis) in the manner described using FIG. 4.

Note that as the resolution, instead of using the resolution indicated by a visually-checked value and the like, it is also possible to use a resolution indicated by a value measured with resolution measuring software or the like, a resolution indicated by a contrast value in a given spatial frequency, which is measured from a captured image, and so on.

The speed resolution database 104 (FIG. 1) stores, as a table (hereinafter a speed resolution table), a relationship between the resolution (vertical axis) and the blur amount dependent on the shutter speed (horizontal axis) as shown in FIG. 5. In the speed resolution table (data 104d), depending on the speed of the object 101x, the associated resolution value in the speed resolution table changes.

Furthermore, in the speed resolution table, the resolution value also changes depending on the identification number of the lens 201, an MTF of the lens 201 appropriate for an imaged height, the number of pixels of the image sensor unit 203, an f number, and so on.

By preparing two or more speed resolution tables corresponding to at least one of the above factors, e.g. two speed resolution tables corresponding to two MTFs, the continuous-capturing parameter calculating unit 106 can refer to a more accurate table, and reference to the other less accurate table can be prevented.

Furthermore, misalignment in alignment of the continuously-captured images, which is performed in the continuous capturing of images and synthesizing of the continuously-captured images, may be considered (the alignment is, for example, identifying, in one of the continuously-captured images, a position of a portion of the object, which portion is captured at a position in another one of the continuously-captured images, and the misalignment is, for example, a positional relationship between the two positions). For example, by multiplying the measured resolution by a multiplying factor for which deterioration in resolution caused by the misalignment between each position is taken into consideration, it is possible to create a table having accuracy higher than accuracy obtained by using the measured resolution without the multiplication.

The luminance value resolution database 105 (FIG. 1) stores data dependent on a pair of the luminance value of the object and the total exposure time in the continuous capturing of images and synthesizing of the continuously-captured images. For example, data corresponding to a total exposure time and a luminance value in each of two or more pairs is stored. Each piece of data is data (data 105d) indicating a relationship between a noise amount (shutter speed) and a resolution.

In the case of performing the continuous capturing of images and synthesizing of the continuously-captured images to capture an object having a small luminance value, the noise amount changes depending on the pair of a shutter speed and the number of images to be continuously captured, even when the total exposure time in the continuous capturing of images and synthesizing of the continuously-captured images is the same.

Figure 6:
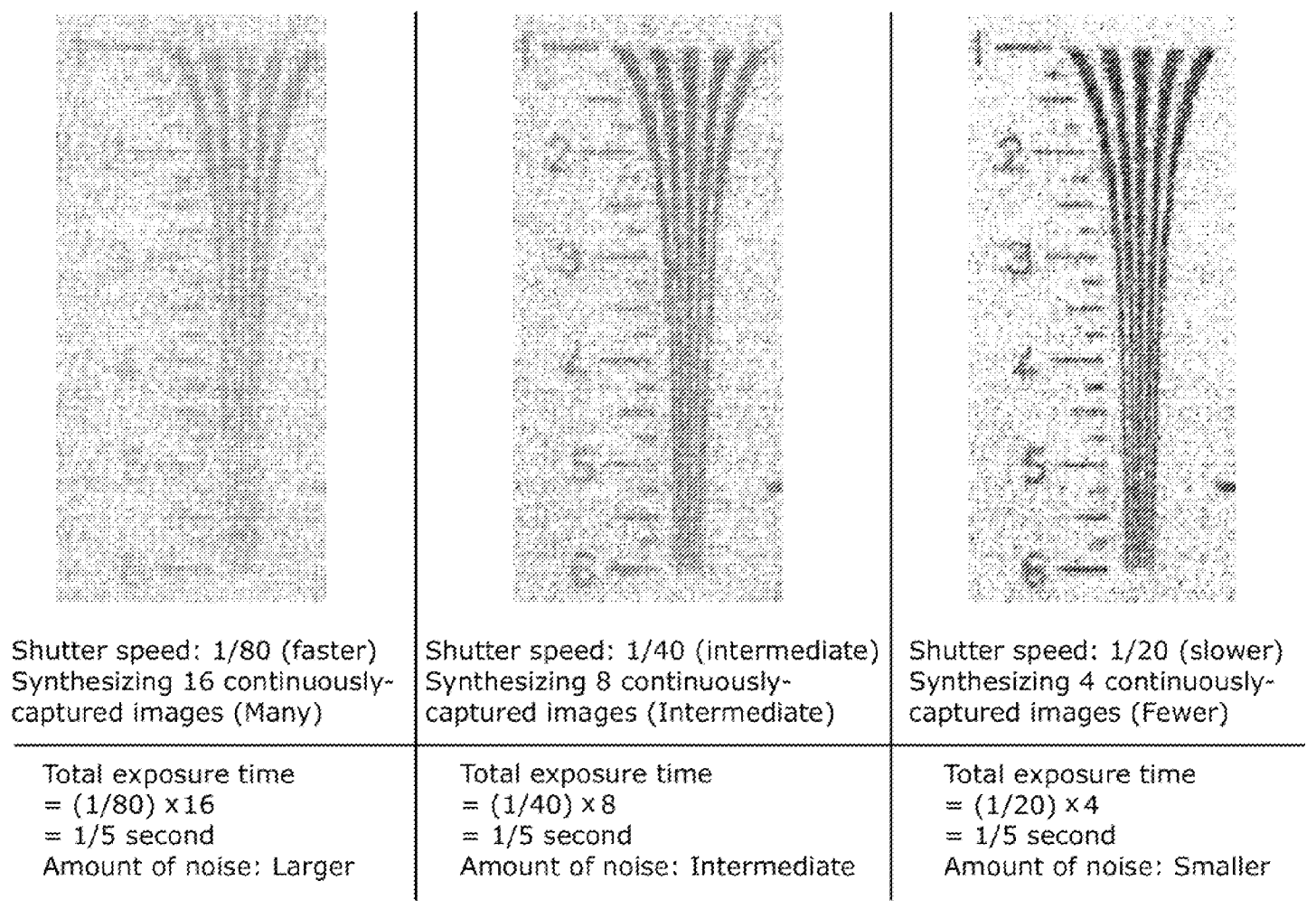

FIG. 6 shows images obtained by continuously capturing, with a total exposure time $1/5$ (sec), images of an object having a very small luminance value X and by synthesizing the continuously-captured images.

For each of the three images shown in FIG. 6, the pair of a shutter speed and the number of images to be continuously captured is different, while the total exposure time is the same ($1/5$ sec) for all of the images.

In the case where the shutter speed is a faster shutter speed $1/80$ (sec) and the number of images to be continuously captured is 16 as shown in the left column in FIG. 6 which includes the left, middle, and right columns, it is apparent that even after two or more continuously-captured images are synthesized, noise is not removed and the image of the resolution chart (image in the left column) is buried in noise.

This is because, since fixed pattern noise such as dark current noise becomes dominant noise in each of the continuously-captured images, it is difficult to remove noise even after such continuously-captured images are added.

When noise reduction (NR) such as application of a low pass filter is to be performed on the synthesized continuously-captured image in such a case, the intensity of NR needs to be set higher because the amount of noise to be removed is larger. Performing the intense NR significantly deteriorates the resolution as well as removing noise, thereby decreasing the visually-checkable resolution.

On the other hand, in the case where the shutter speed is a slower shutter speed of $1/20$ (sec) and the number of images to be continuously captured is 4 (right column), the noise amount in the image of the resolution chart is smaller.

This is because, since the amount of exposure per continuously-captured image increases and the effect arising from fixed pattern noise such as dark current noise decreases, it becomes easier to remove noise by adding up the continuously-captured images.

When NR is to be performed on the synthesized continuously-captured image in such a case, the intensity of NR can be set lower because the amount of noise to be removed is smaller. Thus, the degree of deterioration in resolution caused by NR becomes smaller, thereby increasing the visually-checkable resolution.

Figure 7:
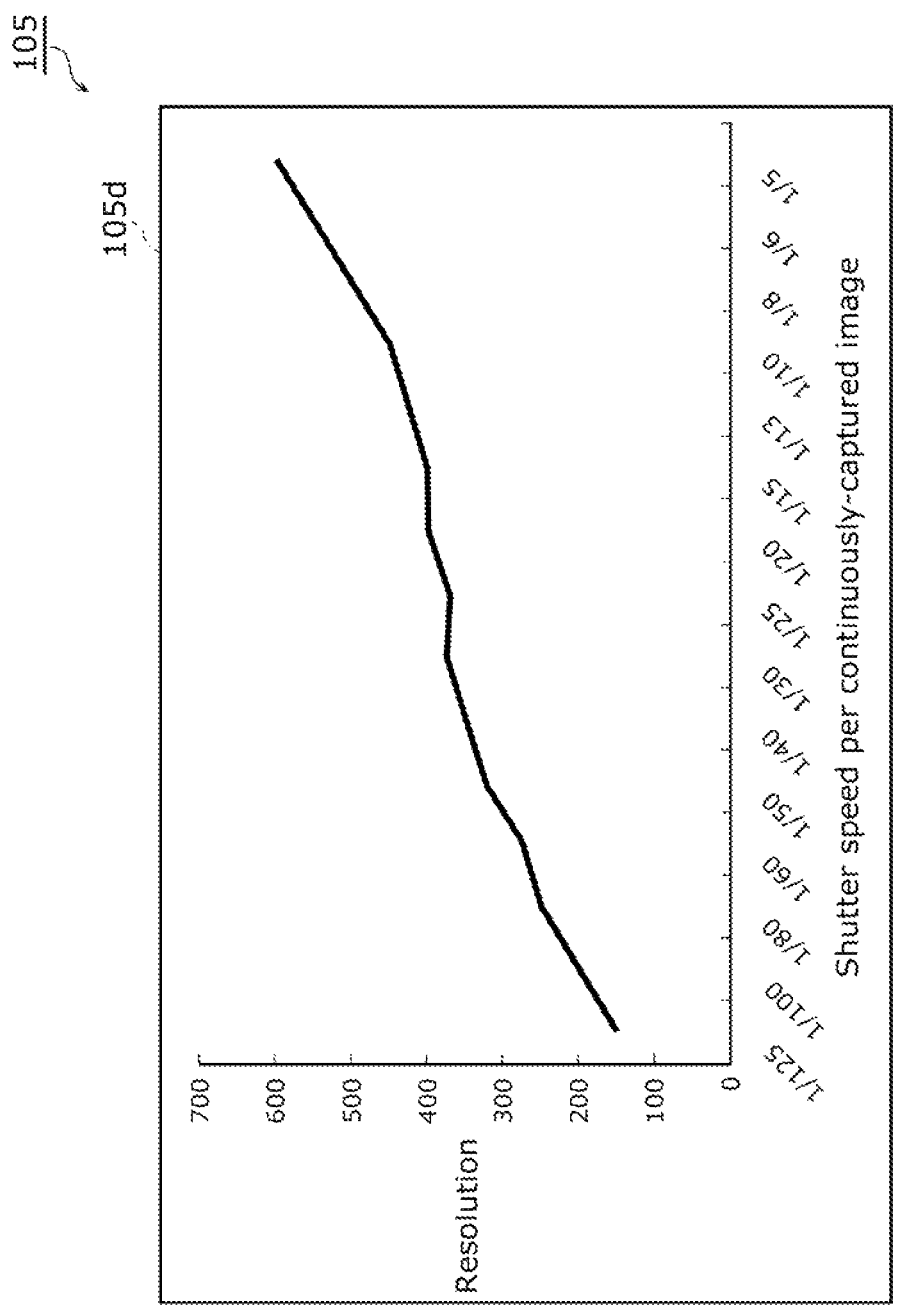
FIG. 7 shows a table of noise amounts and resolutions which is stored in a luminance value resolution database according to Embodiments 1, 2, and 3 of the present invention.

FIG. 7 is a graph showing such a relationship between a resolution (vertical axis) and a pair of a shutter speed per continuously-captured image and the number of images to be continuously captured (horizontal axis), in the case of a pair of the luminance value X and the total exposure time $1/5$ (sec).

Since the total exposure time is fixed, the number of images to be continuously captured is uniquely determined as the value calculated by dividing the "total exposure time" by the "shutter speed".

For the resolution in the luminance value resolution database 105 and the resolution in the speed resolution database 104, values measured with the same scale are used.

Note that the resolution may be measured without NR or measured after existing NR is performed.

The luminance value resolution database 105 stores, as a table (hereinafter a luminance value resolution table), the relationship as shown in FIG. 7 between a pair of a shutter speed and the number of images to be continuously captured (horizontal axis) and a resolution (noise amount, vertical axis) of a synthesized continuously-captured image obtained when images are continuously captured using that pair of the shutter speed and the number of images to be continuously captured.

In the luminance value resolution table (data 105d), the resolution value is different from resolution values in other luminance value resolution tables depending on which pair of the luminance value of the object and the total exposure time in the continuous capturing of images and synthesizing of the continuously-captured images corresponds to the luminance value resolution table.

Moreover, in the luminance value resolution table, the resolution value changes from resolution values in the other luminance value resolution tables depending also on, for example, the identification number of the image sensor unit 203, the number of pixels of the image sensor unit 203, and the temperature data of the image sensor unit 203 which correspond to the luminance value resolution table. By preparing a luminance value resolution table corresponding to at least one of the above factors, the continuous-capturing parameter calculating unit 106 can refer to a more accurate table.

As described above, the data 103$d$ (information 205$a$ in FIG. 17) and the data 102$d$ (information 205$v$ in FIG. 17) shown in FIG. 1 are obtained.

Using the data 103$d$, a first movement (speed), which is a movement of the object 101$x$ per unit of time, and the like, is identified.

The first movement (movement 101$x$M) is a movement and so on relative to a movement of the image capturing device 100.

Figure 9:
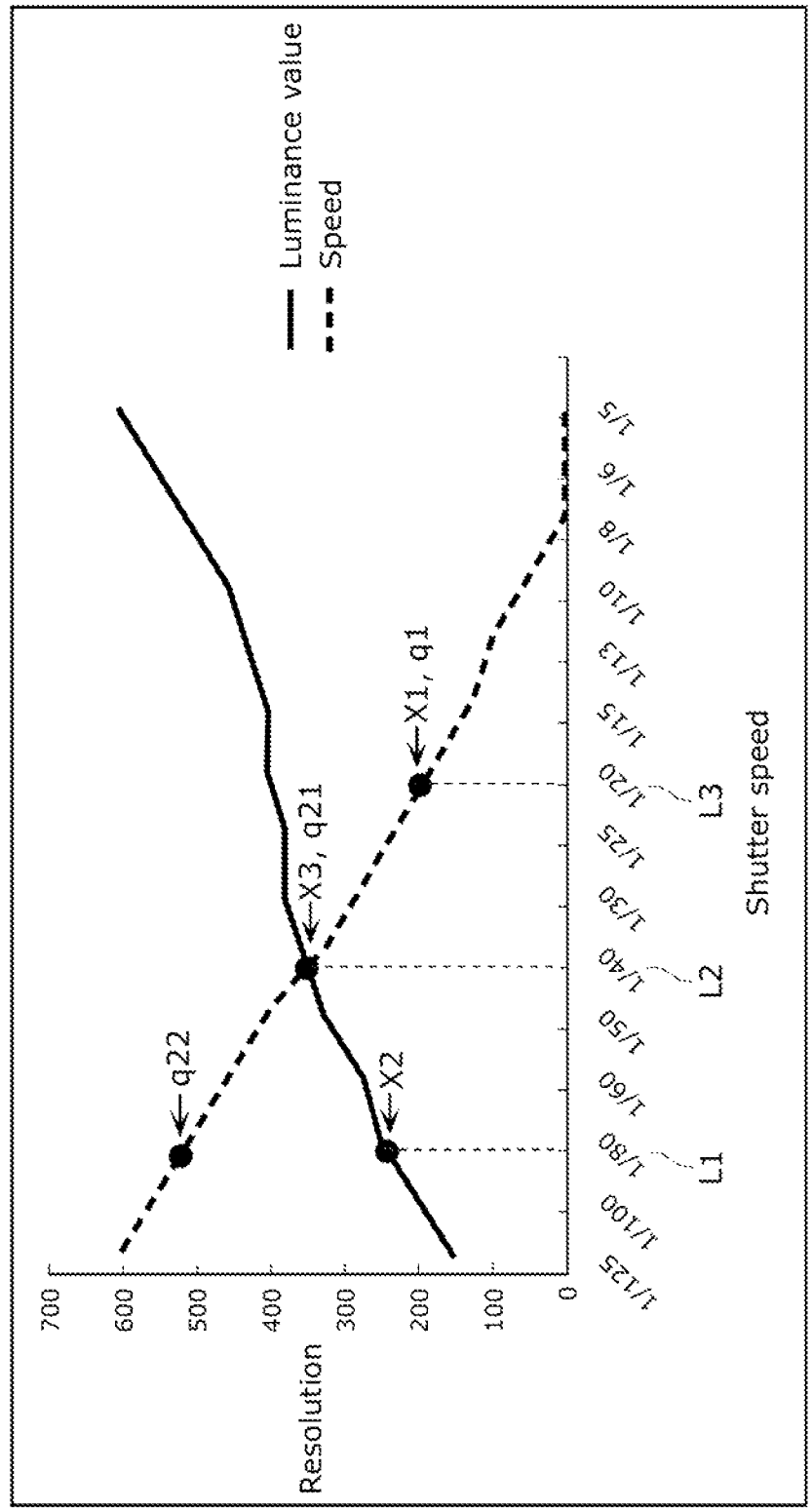
FIG. 9 shows a graph referred to by a continuous-capturing parameter calculating unit according to Embodiments 1, 2, and 3 of the present invention for determining a shutter speed and the number of images to be continuously captured.

There is a second movement of the object 101$x$ which is a movement obtained by making the first movement during the exposure time (horizontal axis in FIG. 9).

From the second movement, a first resolution (dashed line in FIG. 9) is identified which is an upper limit of the resolution of the synthesized continuously-captured image generated when the second movement is made.

The first resolution decreases when the first movement is relatively small and the second movement decreases, and increases when the first movement is relatively large and the second movement increases.

In other words, from the data 103$d$, the first resolution (dashed line in FIG. 9) is identified as a resolution and the like in the case of the second movement identified from the first movement indicated in the data 103$d$.

Meanwhile, the data 102$d$ indicates a first luminance level, which is a luminance level of the object 101$x$ obtained per unit of time, and so on.

There is a second luminance level, which is a luminance level of the object 101$x$ obtained during the exposure time and is a level or the like calculated by multiplying the first luminance level by the length of the exposure time.

There is a ratio of the fixed pattern noise level to the second luminance level (a noise amount relative to the second luminance level).

From this ratio, the second resolution (solid line in FIG. 9) is identified which is an upper limit of the resolution of the synthesized continuously-captured image to be generated.

The second resolution decreases when the ratio of the fixed pattern noise increases, and increases when the ratio of the fixed pattern noise decreases.

Note that when the above ratio of the fixed pattern noise is higher, the pixels at the first luminance level are buried in the fixed pattern noise, and thus the second resolution may be lower. On the other hand, the pixels are not buried in the fixed pattern noise when the ratio of the fixed pattern noise is lower, and thus the second resolution may be higher.

In other words, from the data 102$d$, the second resolution (solid line in FIG. 9) is identified as a resolution or the like from the ratio of the fixed pattern noise to the second luminance level which is calculated from the first luminance level indicated in the data 102$d$.

The resolution of the synthesized continuously-captured image to be generated is, for example, a third resolution which is, for example, a lower one of the first and second resolutions.

Meanwhile, there is a plurality of exposure times ($\frac{1}{80}$ second, $\frac{1}{40}$ second, $\frac{1}{20}$ second, and so on in FIG. 9).

From the data 103$d$, the second movements corresponding to respective exposure times ($\frac{1}{80}$ second, $\frac{1}{40}$ second, $\frac{1}{20}$ second, and so on in FIG. 9) are identified as movements or the like each of which is obtained by making the first movement (indicated in the data 103$d$) for a corresponding one of the exposure times, and then the first resolutions corresponding to the respective exposure times are identified (values q1, q21, q22, and so on in FIG. 9).

Moreover, from the data 102$d$, the first resolution corresponding to one of the exposure times is identified and then the second resolution corresponding to the same one of the exposure times is identified, which means, by identifying the first resolutions corresponding to the respective exposure times, the second resolutions corresponding to the respective exposure times are identified (values X2, X3, and so on).

In other words, from the two pieces of data of the data 103$d$ and the data 102$d$, the third resolutions (values X2, X3, X1, and so on) are identified for the respective exposure times.

Moreover, from the data 103$d$ and the data 102$d$, the highest third resolution is identified from among the third resolutions identified for the plurality of exposure times, and the exposure time corresponding to the highest third resolution is identified ($\frac{1}{40}$ second in FIG. 9).

Note that as shown in FIG. 9, the first resolution (value q21) for the exposure time corresponding to the identified highest third resolution is the same as the second resolution (value X3) for that exposure time, for example.

As described later, the following control is performed, for example.

In this control, for example, light exposure is caused for the exposure time corresponding to the highest third resolution identified from the data 103$d$ and the data 102$d$.

Note that in this control, images are continuously captured in number that makes the product of the exposure time and that number equal to a predetermined total exposure time, for example.

With this, a sum of the exposure times of the continuously-captured images is made equal to the above-described total exposure time.

Furthermore, in this control, for example, images to be continuously captured in the above number are each captured through the light exposure performed for that exposure time.

Note that such control is performed by, for example, outputting the information 205$b$ (FIG. 17) indicating the exposure time and information 205$n$ indicating the number of images to be continuously captured.

Note that this control is performed by the parameter setting unit 205 (FIG. 17), for example.

The continuous-capturing parameter calculating unit 106 calculates a shutter speed and the number of images to be continuously captured which are optimal for the continuous capturing of images and synthesizing of the continuously-captured images, from a combination of the speed of the object, the total exposure time in the continuous capturing of images and synthesizing of the continuously-captured images, and the luminance value of the object. The calculated number of images to be continuously captured, and so on are then outputted to the image capturing unit 101. A method for calculating the shutter speed and the number of images to be continuously captured in the case where the total exposure time in the continuous capturing of images and synthesizing of the continuously-captured images is $\frac{1}{5}$ (sec), the speed of the object is Y, and the luminance value of the object is X, for example, will be described using a process flow in FIG. 8.

Figure 8:
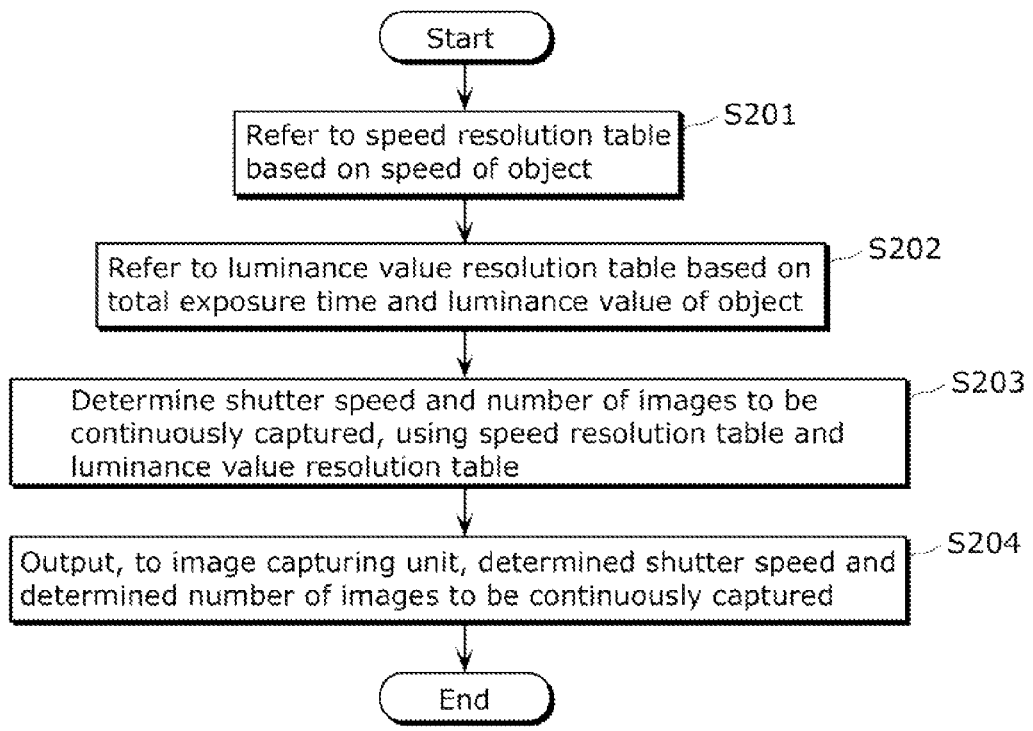
FIG. 8 is a flowchart of a continuous-capturing parameter calculating unit according to Embodiment 1 of the present invention.

FIG. 8 is a process flow diagram.

In Step S201, the speed resolution table, as shown in FIG. 5, which corresponds to the object speed Y is referred to in the speed resolution database 104.

At this time, a more accurate speed resolution table can be referred to by using data outputted from the camera data holding unit 207, such as the identification number of the lens 201, an MTF of the lens 201 appropriate for the imaged height, the number of pixels of the image sensor unit 203, and an f number.

In Step S202, the luminance value resolution table, as shown as the graph in FIG. 7, which corresponds to a pair of the object luminance value X and the total exposure time ⅕ (sec) is referred to in the luminance value resolution database 105.

At this time, a more accurate luminance value resolution table can be referred to by using the data outputted from the camera data holding unit 207, such as the identification number of the image sensor unit 203, the number of pixels of the image sensor unit 203, and the temperature data of the image sensor unit 203.

In Step S203, a shutter speed and the number of images to be continuously captured, which are optimal for the continuous capturing of images and synthesizing of the continuously-captured images, are calculated using the speed resolution table obtained in Step S201 and the luminance value resolution table obtained in Step S202.

FIG. 9 shows a graph created by plotting the resolutions in FIG. 5 and the resolutions in FIG. 7.

Since the resolutions on the vertical axes in FIGS. 5 and 7 are measured with the same scale, the speed resolution table and the luminance value resolution table can be plotted on a graph having the same axis as shown in FIG. 9.

The speed resolution table shows a relationship between the resolution (data indicated by a dashed line) and the blur amount (the second movement) in the synthesized continuously-captured image, which is dependent on the shutter speed (horizontal axis). In this relationship, the resolution (vertical axis) increases as the shutter speed (horizontal axis) increases as indicated on the further left. The luminance value resolution table shows a relationship between a shutter speed (horizontal axis) and the resolution (noise amount, data indicated by a solid line) of a synthesized continuously-captured image captured using a pair of that shutter speed and the number of images to be continuously captured (horizontal axis, shutter speed). In this relationship, the resolution (vertical axis) decreases when the shutter speed (horizontal axis) increases as indicated on the further left.

Using such a graph shown in FIG. 9, it is possible to determine the resolution (a lower one of the two resolutions) of the synthesized continuously-captured image for a given shutter speed (a pair of a shutter speed and the number of images to be continuously captured, horizontal axis in FIG. 9).

First, as an example, a case will be described in detail where the shutter speed is set to ¹⁄₂₀ (sec) and the number of images to be continuously captured is set to 4 as the parameters of the continuous capturing of images and synthesizing of the continuously-captured images (see the right column in FIG. 4 and the right column in FIG. 6).

In this case, since the shutter speed per continuously-captured image is relatively slow, that is, since the time for exposure performed for capturing one image is relatively long, the degree of deterioration in resolution of the synthesized continuously-captured image caused by noise is smaller (see FIG. 7, data indicated by the solid line in FIG. 9, the image in the right column in FIG. 6, and so on).

However, because the blur amount per continuously-captured image is larger, that is, because the blur amount in the image of the object in each of the continuously-captured images is larger, the degree of deterioration in resolution caused by blur is larger (see FIG. 5, data indicated by the dashed line in FIG. 9, the image in the right column in FIG. 4, and so on).

Thus, the deterioration in resolution caused by blur (see data indicated by the dashed line in FIG. 9, and so on) dominates in the synthesized continuously-captured image, and the resolution of the synthesized continuously-captured image is a relatively low value X1 comparable to the resolution according to the speed resolution table (see the dashed line in FIG. 9, and so on) when the shutter speed is ¹⁄₂₀ (sec).

Next, a case will be described where the shutter speed is set to ¹⁄₈₀ (sec) and the number of images to be continuously captured is set to 16 as the parameters of the continuous capturing of images and synthesizing of the continuously-captured images (see the image in the left column in FIG. 4, the image in the left column in FIG. 6, and so on).

In this case, the shutter speed per continuously-captured image is faster (shutter speed on the relatively left side on the horizontal axis in FIG. 5), and thus blur is not likely to arise, resulting in a smaller degree of deterioration in resolution caused by blur (see data indicated by the dashed line in FIG. 9, FIG. 5, the image in the left column in FIG. 4, and so on).

However, since the noise amount per continuously-captured image is larger, the degree of deterioration in resolution caused by noise is larger in the synthesized continuously-captured image (see FIG. 7, data indicated by the solid line in FIG. 9, the image in the left column in FIG. 6, and so on).

Thus, the deterioration in resolution caused by noise (see data indicated by the solid line in FIG. 9, and so on) dominates in the synthesized continuously-captured image, and the resolution of the synthesized continuously-captured image is a relatively low value X2 comparable to the resolution according to the luminance value resolution table (see FIG. 7, the solid line in FIG. 9, and so on) when the shutter speed is ¹⁄₈₀ (sec).

Next, a case will be described where the shutter speed is set to ¹⁄₄₀ (sec) and the number of images to be continuously captured is set to 8 as the parameters of the continuous capturing of images and synthesizing of the continuously-captured images (see the middle column in FIG. 4, the middle column in FIG. 6, and so on).

It is apparent from FIG. 9 that when the shutter speed is ¹⁄₄₀ (sec), the resolution according to the speed resolution table (dashed line) and the resolution according to the luminance value resolution table (solid line) are comparable (approximately the same). In this case, the effect arising from the deterioration in resolution caused by blur and the effect arising from the deterioration in resolution caused by noise are comparable. Thus, the resolution of the synthesized continuously-captured image is the highest value X3.

As described above, it is possible to generate an adequate synthesized continuously-captured image having a high resolution and a high sensitivity by setting the shutter speed (pair of a shutter speed and the number of images to be continuously captured) to a shutter speed at the intersection of the resolution according to the speed resolution table and the resolution according to the luminance value resolution table.

In other words, the shutter speed (pair of a shutter speed and the number of images to be continuously captured) is set to a shutter speed that makes the degree of deterioration in resolution of the synthesized continuously-captured image caused by blur and the degree of deterioration in resolution of the synthesized continuously-captured image caused by noise comparable to each other.

The faster the speed of the object, the larger the effect arising from the deterioration in resolution caused by blur, thereby resulting in a lower resolution at each shutter speed as shown by the data indicated by the dashed line according to the speed resolution table in FIG. 9.

Thus, the faster the speed of the object, the faster the shutter speed in the continuous capturing of images and synthesizing of the continuously-captured images, thereby resulting in a larger number of images to be continuously captured.

The smaller the luminance value of the object, the larger the effect arising from the deterioration in resolution caused by noise (see data indicated by the solid line in FIG. 9), thereby resulting in a lower resolution at each shutter speed as shown by the data indicated by the solid line according to the luminance value resolution table in FIG. 9.

Thus, the smaller the luminance value of the object, the slower the shutter speed in the continuous capturing of images and synthesizing of the continuously-captured images, thereby resulting in a smaller number of images to be continuously captured.

When the luminance value is extremely small or when the speed is extremely slow, the number of images to be continuously captured is set to the minimum of 1 in some cases.

Furthermore, since the shutter speed for capturing each of the images to be continuously captured in the continuous capturing of images and synthesizing of the continuously-captured images is determined in the above manner, blur appears in each of the continuously-captured images to some extent.

In Step S204, the pair of the shutter speed and the number of images to be continuously captured, which is determined in Step S203, is outputted to the camera parameter setting unit 209 (FIG. 3).

The continuously-captured-image synthesizing unit 107 (FIG. 1) synthesizes continuously-captured images captured by the image capturing unit 101.

Note that as the synthesizing method, a method of identifying (aligning) positions in the continuously-captured images, at which the same portion of the object is shown, can be considered, for example. Then, in this method, the pixel values of the identified positions in the continuously-captured images are summed (added). With this, an appropriate operation can be implemented.

In other words, a portion in the synthesized continuously-captured image generated may be identified in each of the continuously-captured images, for example. The pixel value of the portion in the synthesized continuously-captured image may be, for example, an average of the pixel values of the portions identified in the continuously-captured images.

Note that as the aligning method, the Lucas-Kanade method, a method achieved using information obtained from a gyrosensor, and so on can be considered.

There are cases where blur remains in the images continuously captured according to an aspect of the present invention. Thus, by performing, after the continuously-captured images are added, existing blur correction such as Wiener filter on the synthesized continuously-captured image resulted from the addition, the resolution of the synthesized continuously-captured image can be further increased.

Note that the points described in FIG. 17 include points common to a plurality of embodiments, meaning, for example, applicable to Embodiment 1 as well as other embodiments.

Embodiment 2

Next, Embodiment 2 will be described. The configuration in Embodiment 2 is, for example, basically the same as the configuration in Embodiment 1 and is different only in the process of the continuous-capturing parameter calculating unit 106.

The continuous-capturing parameter calculating unit 106 in Embodiment 1 refers to the tables which exist in the speed resolution database 104 and the luminance value resolution database 105.

The values in the speed resolution table differ depending on the speed of the object while the values in the luminance value resolution table differ depending on the pair of a luminance value of the object and a total exposure time in the continuous capturing of images and synthesizing of the continuously-captured images. Thus, preparing a speed resolution table to correspond to each value of the speed of the object, for example, results in a large amount of data used.

In Embodiment 2, a method for converting, in each database, an existing table into a non-existing table will be described. Note that such conversion may be performed by the continuous-capturing parameter calculating unit 106, for example. This conversion reduces the amount of data in each database.

In the present embodiment, a method will be described which is for calculating, by the continuous-capturing parameter calculating unit 106, an optimal shutter speed and an optimal number of images to be continuously captured, in the case where the luminance value of the object is X, the speed of the object is Y, and the total exposure time is T.

Figure 10:
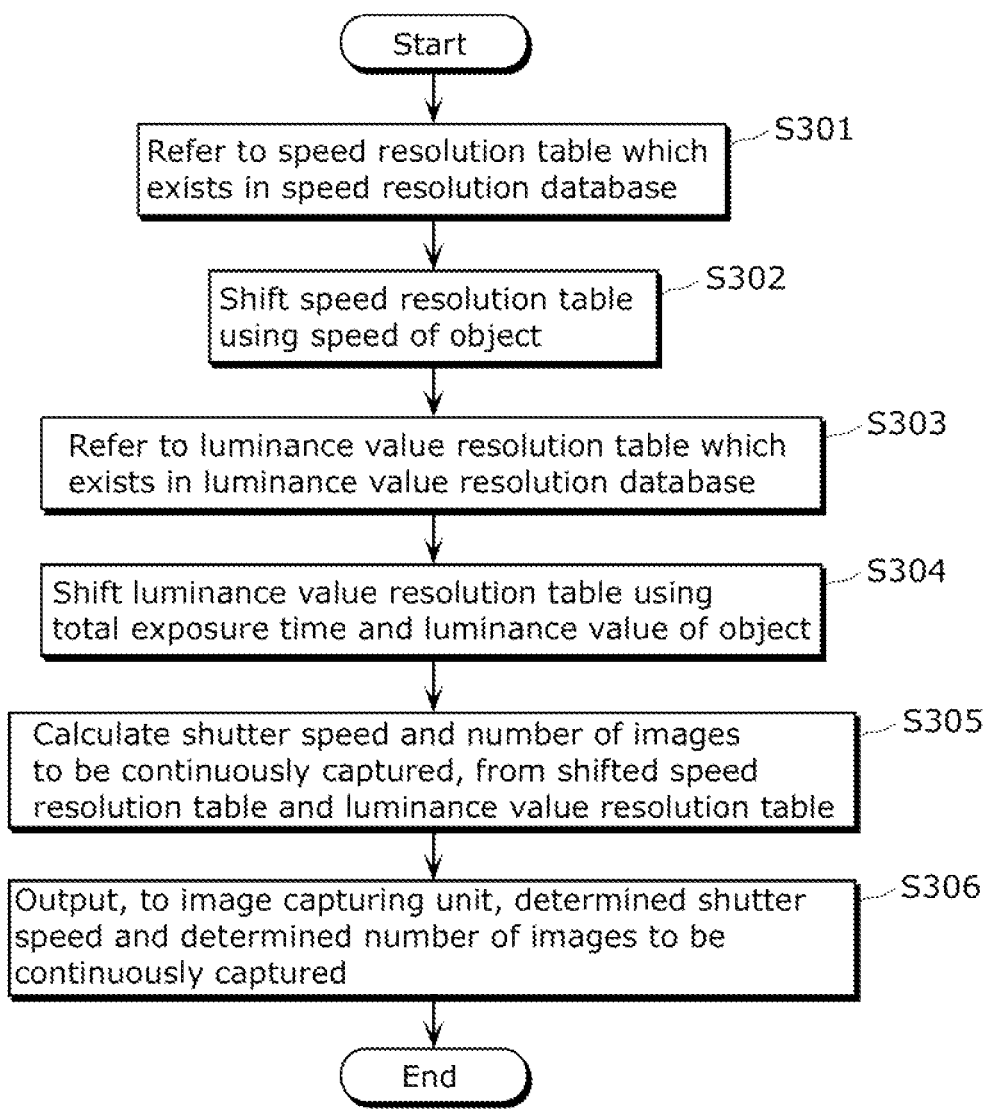
FIG. 10 is a flowchart of a continuous-capturing parameter calculating unit according to Embodiment 2 of the present invention.

FIG. 10 shows a process flow according to Embodiment 2.

As a precondition, it is assumed that in the speed resolution database 104, a speed resolution table corresponding to the speed Y does not exist, but a speed resolution table corresponding to a speed Y/2 exists.

Moreover, it is assumed that in the luminance value resolution database 105, a luminance value resolution table corresponding to a pair of the luminance value X and the total exposure time T does not exist, but a speed resolution table corresponding to a pair of a luminance value 2X and a total exposure time T/2 exists.

In Step S301, the speed resolution table which exists in the speed resolution database 104 and corresponds to the speed of the object Y/2 is referred to.

In Step S302, the speed resolution table corresponding to the speed Y is obtained from the referred speed resolution table corresponding to the speed Y/2.

There is a correlation between the speed of the object and the blur amount which is dependent on the shutter speed. For example, the blur amount at the shutter speed 1/20 (sec) when the speed is Y/2 is equal to the blur amount at the shutter speed 1/40 (sec) when the speed is Y. Thus, the resolutions measured are also equal.

Figure 11:
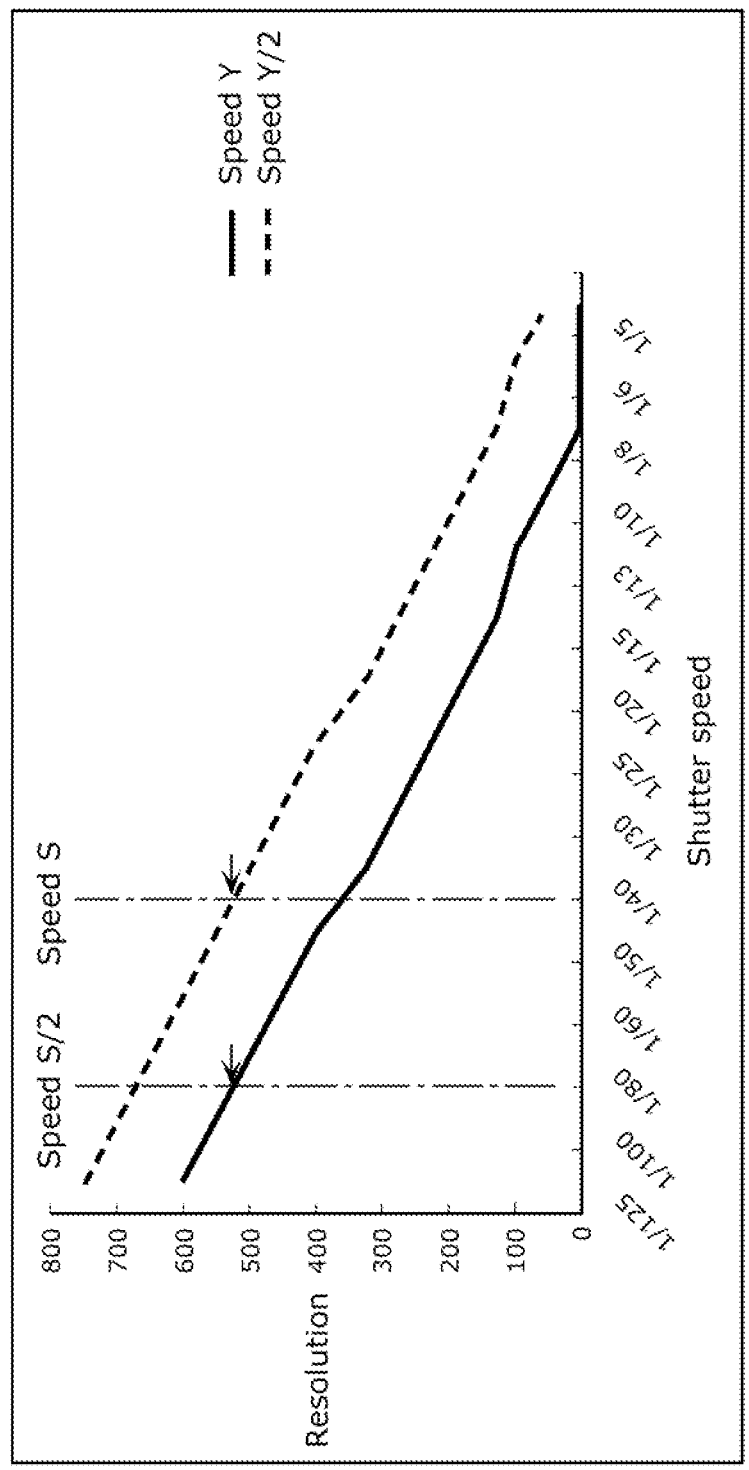
FIG. 11 shows a graph illustrating that a continuous-capturing parameter calculating unit according to Embodiment 2 of the present invention shifts a table of blur amounts and resolutions according to a speed of an object.

FIG. 11 shows a relationship in the case of converting, using the above property, the speed resolution table corresponding to the speed Y/2 into the speed resolution table corresponding to the speed Y.

The data is shifted so that the resolution corresponding to a shutter speed S when the speed is Y/2 becomes equal to the resolution corresponding to a shutter speed S/2 when the speed is Y.

In Step S303, the luminance value resolution table which exists in the luminance value resolution database 105 and corresponds to the pair of the object luminance value 2X and the total exposure time T/2 is referred to.

In Step S304, the luminance value resolution table corresponding to the pair of the object luminance value X and the total exposure time T is obtained from the luminance value resolution table corresponding to the pair of the object luminance value 2X and the total exposure time T/2.

The pair of the object luminance value and the total exposure time is correlated with the noise amount in the synthesized continuously-captured image which is captured using a pair of the shutter speed and the number of images to be continuously captured.

For example, the amount of exposure per continuously-captured image and the number of images to be continuously captured are the same between: the synthesized continuously-captured image obtained by capturing the object having the luminance value 2X, using the shutter speed 1/80 (sec) and the total exposure time 1/5 (sec) for 16 images to be continuously captured; and the synthesized continuously-captured image obtained by capturing the object having the luminance value X, using the shutter speed 1/40 (sec) and the total exposure time 2/5 (sec) for 16 images to be continuously captured. This results in the same noise amount and the same resolution to be measured.

Figure 12:
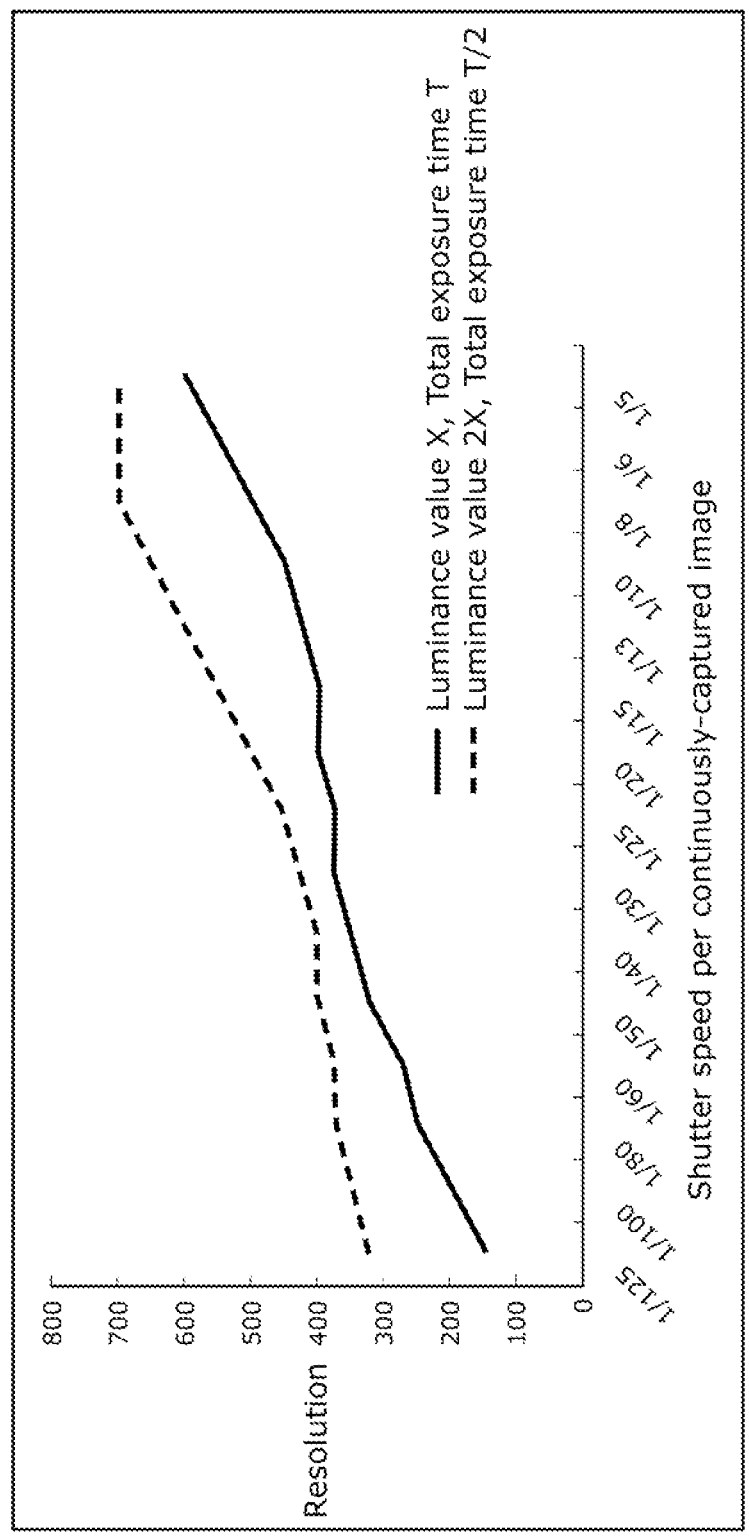
FIG. 12 shows a graph illustrating that a continuous-capturing parameter calculating unit according to Embodiment 2 of the present invention shifts a table of noise amounts and resolutions according to a pair of a luminance value of an object and a total exposure time.

FIG. 12 shows a relationship in the case of converting, using the above property, the luminance value resolution table corresponding to the pair of the luminance value 2X and the total exposure time T/2 into the luminance value resolution table corresponding to the pair of the luminance value X and the total exposure time T.

The data is shifted so that the resolution corresponding to the shutter speed S and T/2S number of images to be continuously captured in the case of the pair of the luminance value 2X and the total exposure time T/2 becomes equal to the resolution corresponding to the shutter speed 2S and T/2S number of images to be continuously captured in the case of the pair of the luminance value X and the total exposure time T.

In Step S305, a shutter speed and the number of images to be continuously captured, which are optimal for the continuous capturing of images and synthesizing of the continuously-captured images, are calculated using the speed resolution table and the luminance value resolution table obtained in Step S302 and Step S304, respectively. As the method for this calculation, the same method as that used in Step S203 in Embodiment 1 is used. In Step S306, the shutter speed and the number of images to be continuously captured, which are determined in Step S305, are outputted to the camera parameter setting unit 209.

Embodiment 3

Next, Embodiment 3 will be described. The configuration in Embodiment 3 is basically the same as the configuration in Embodiment 1, and is different from Embodiment 1 only in the process of the continuous-capturing parameter calculating unit 106.

Embodiment 1 describes the case, as shown in FIG. 9, where the graph showing the resolution data according to the speed resolution table intersects with the graph showing the resolution data according to the luminance value resolution table.

The resolutions according to the speed resolution table and the luminance value resolution table have limit values which are dependent on the number of pixels of the image sensor unit 203 and an MTF of the lens 201.

Figure 13:
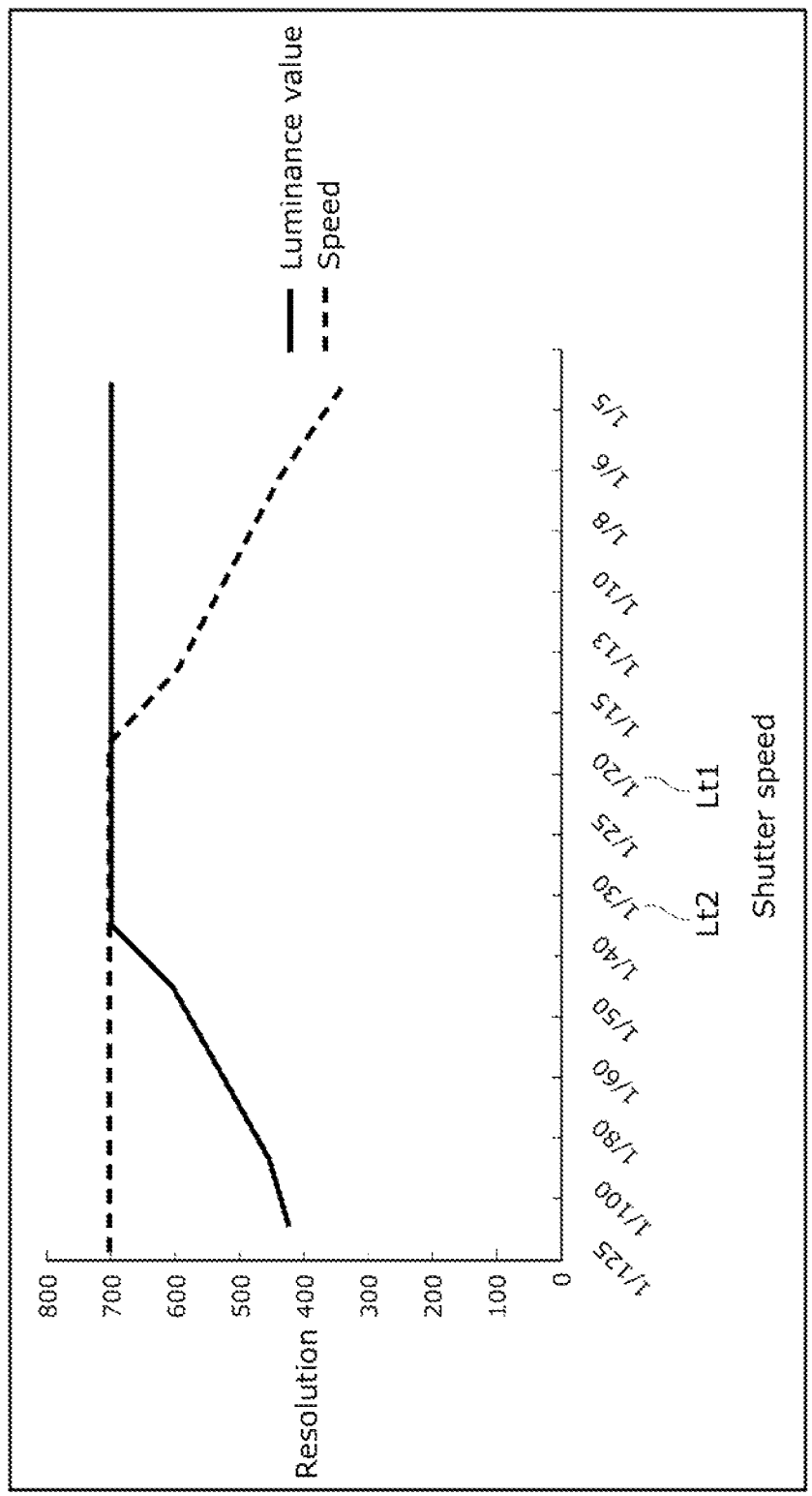
FIG. 13 shows a graph referred to by a continuous-capturing parameter calculating unit according to Embodiment 3 of the present invention for determining a shutter speed and the number of images to be continuously captured.

FIG. 13 shows a graph.

Thus, when the luminance value of the object indicates relatively high brightness, and when the speed of the object is relatively slow, there is a case where, as shown in FIG. 13, the resolutions according to the two tables of the speed resolution table and the luminance value resolution table are saturated at their respective limit values, making it unable to uniquely determine the shutter speed and the number of images to be continuously captured.

The present embodiment will describe a method for determining, in such a case, the shutter speed and the number of images to be continuously captured.

Figure 14:
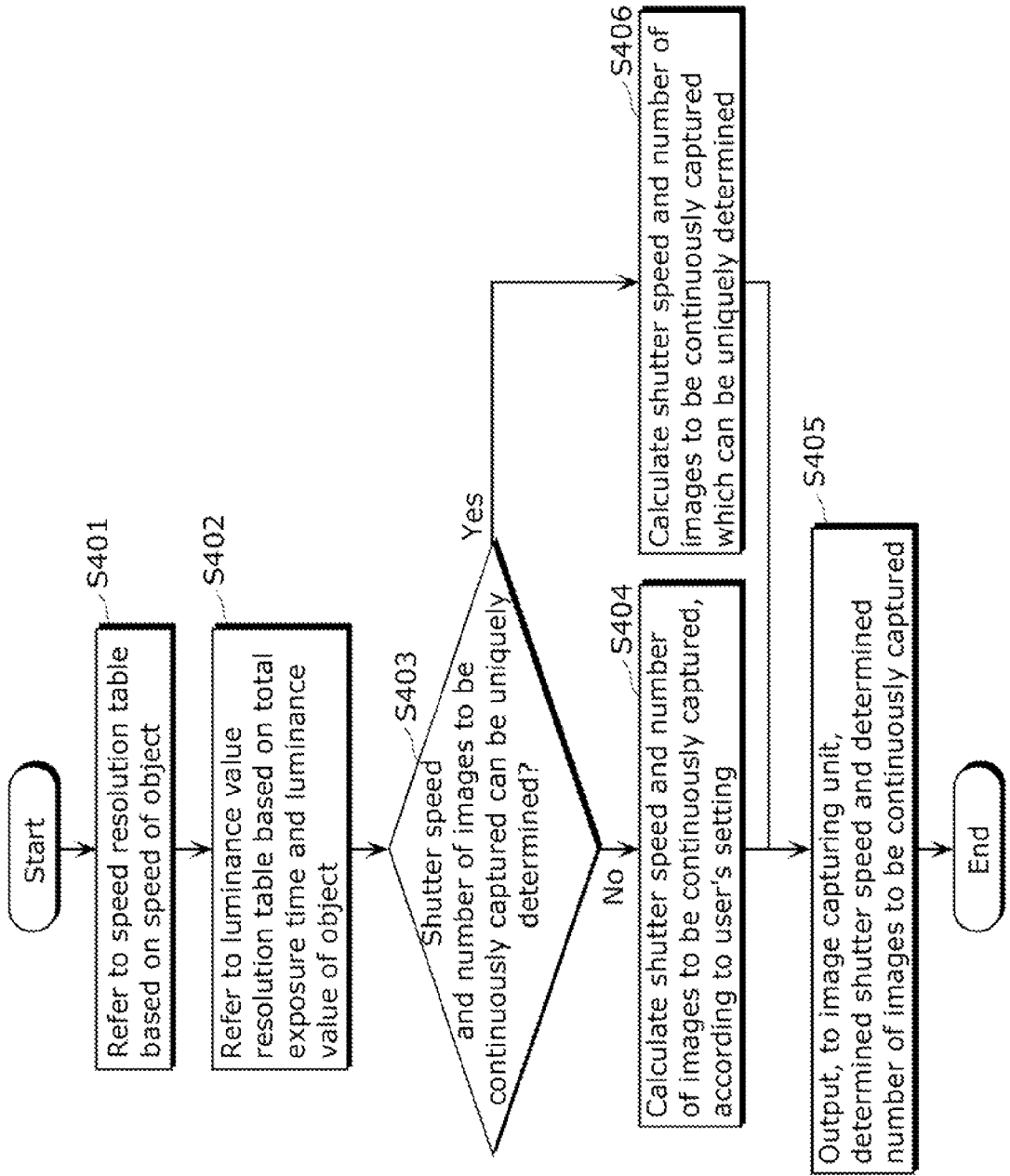
FIG. 14 is a flowchart of a continuous-capturing parameter calculating unit according to Embodiment 3 of the present invention.

FIG. 14 is a process flow of a process performed by the continuous-capturing parameter calculating unit 106 according to Embodiment 3.

Hereinafter, the present embodiment will be described using FIG. 14.

In Steps S401 and S402, the speed resolution table and the luminance value resolution table are obtained using the same method as in Steps S201 and S202 according to Embodiment 1.

In Step S403, it is determined whether or not a pair of a shutter speed and the number of images to be continuously captured can be uniquely determined according to the speed resolution table and the luminance value resolution table obtained in Step S401 and Step S402, respectively.

In the case where the graphs of the speed resolution table and the luminance value resolution table intersect as shown in FIG. 9 described above, a pair of a shutter speed and the number of images to be continuously captured can be uniquely determined.

In that case, in Step S406, a shutter speed and the number of images to be continuously captured are determined using the same method as in Step S203 according to Embodiment 1.

As shown in FIG. 13, in the case where the graphs of the speed resolution table and the luminance value resolution table do not intersect, a pair of a shutter speed and the number of images to be continuously captured cannot be uniquely determined.

In that case, in Step S404, a shutter speed and the number of images to be continuously captured are determined according to user's setting.

In Step S404, a shutter speed and the number of images to be continuously captured are determined based on a priority item selected from the calculation amount, the resolution, and the sensitivity that are set by the user.

A case will be described where the user setting unit 204 prioritizes the calculation amount or the sensitivity, for example.

In the continuous capturing of images and synthesizing of the continuously-captured images, the smaller the number of images to be continuously captured, the smaller the amount of calculation performed by the continuously-captured-image synthesizing unit 107 in the synthesizing of continuously-captured images.

Furthermore, the smaller the number of images to be continuously captured, the larger the luminance value per continuously-captured image, that is, the larger the luminance value of the image of the object in each of the continuously-captured images. This enables reduction in the noise amount of the synthesized continuously-captured image.

Thus, it is preferable that the resolution according to the speed resolution table be the limit value, that the shutter speed be slower, and that the number of images to be continuously captured be smaller.

In the case of FIG. 13, the suitable shutter speed per continuously-captured image is 1/20 (sec).

Next, a case where the user setting unit 204 prioritizes the resolution will be described.

In the case where the speed of the object is unstable and the object moves randomly, there is a possibility that the speed of the object is faster than the speed calculated by the speed calculating unit 103 and there is a possibility that the resolution increases with an increase in the shutter speed in the continuous capturing of images and synthesizing of the continuously-captured images.

Thus, it is preferable that the resolution according to the luminance value resolution table be the limit value, that the shutter speed be faster, and that the number of images to be continuously captured be larger.

In the case of FIG. 13, the suitable shutter speed per continuously-captured image, that is, the suitable shutter speed in capturing each of images to be continuously captured, is 1/30 (sec).

In Step S405, the shutter speed and the number of images to be continuously captured, which are determined in Step S404 or Step S406, are outputted to the camera parameter setting unit 209.

Embodiment 4

Next, Embodiment 4 will be described.

Figure 15:
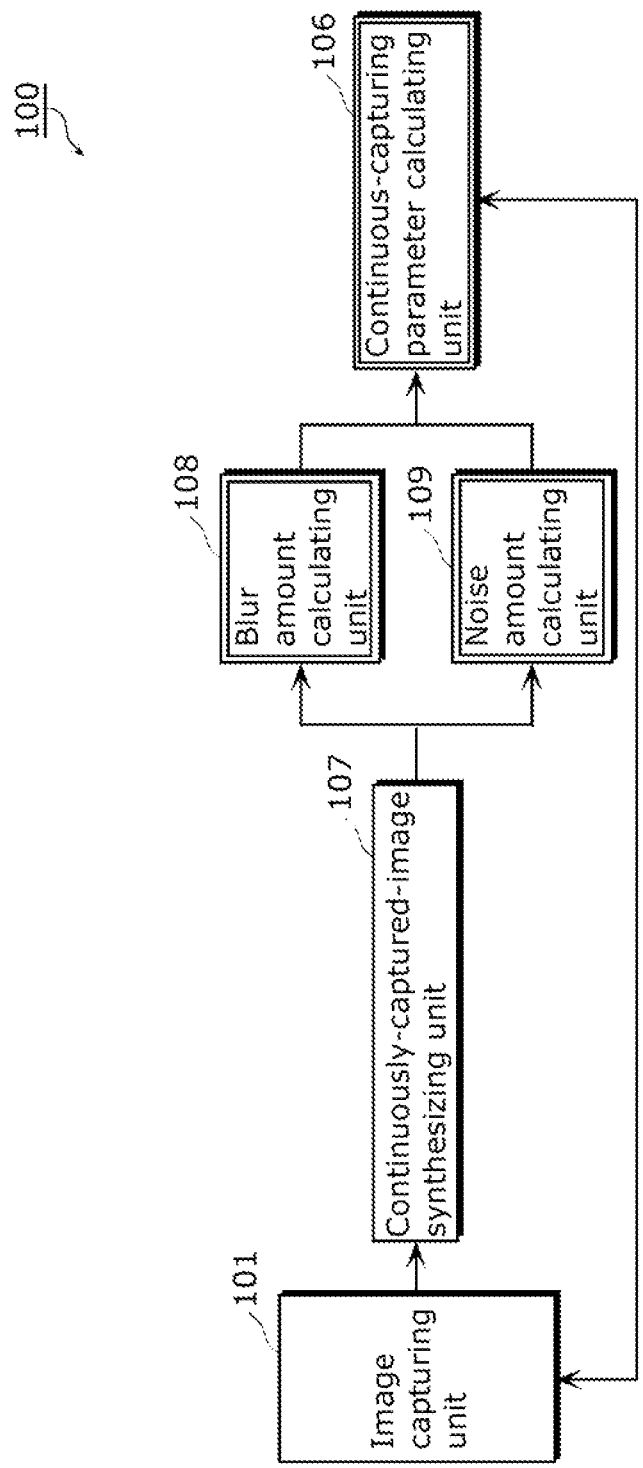
FIG. 15 shows a configuration of an image capturing device according to Embodiment 4 of the present invention.

FIG. 15 shows a configuration of an image capturing device according to Embodiment 4 of the present invention.

Hereinafter, an image capturing device 100 according to the present embodiment will be described using FIG. 15.

In Embodiment 4, the shutter speed and the number of images to be continuously captured are updated using the synthesized continuously-captured image generated by the continuously-captured-image synthesizing unit 107 instead of using the speed resolution database 104 and the luminance value resolution database 105 shown in the configuration diagram of FIG. 1.

The processes in the respective functional blocks of the image capturing unit 101 and the continuously-captured-image synthesizing unit 107 are the same as the processes in the same functional blocks in Embodiment 1.

However, the process of the continuous-capturing parameter calculating unit 106 is different from that in Embodiment 1.

Moreover, a blur amount calculating unit 108 and a noise amount calculating unit 109 are newly added.

Figure 16:
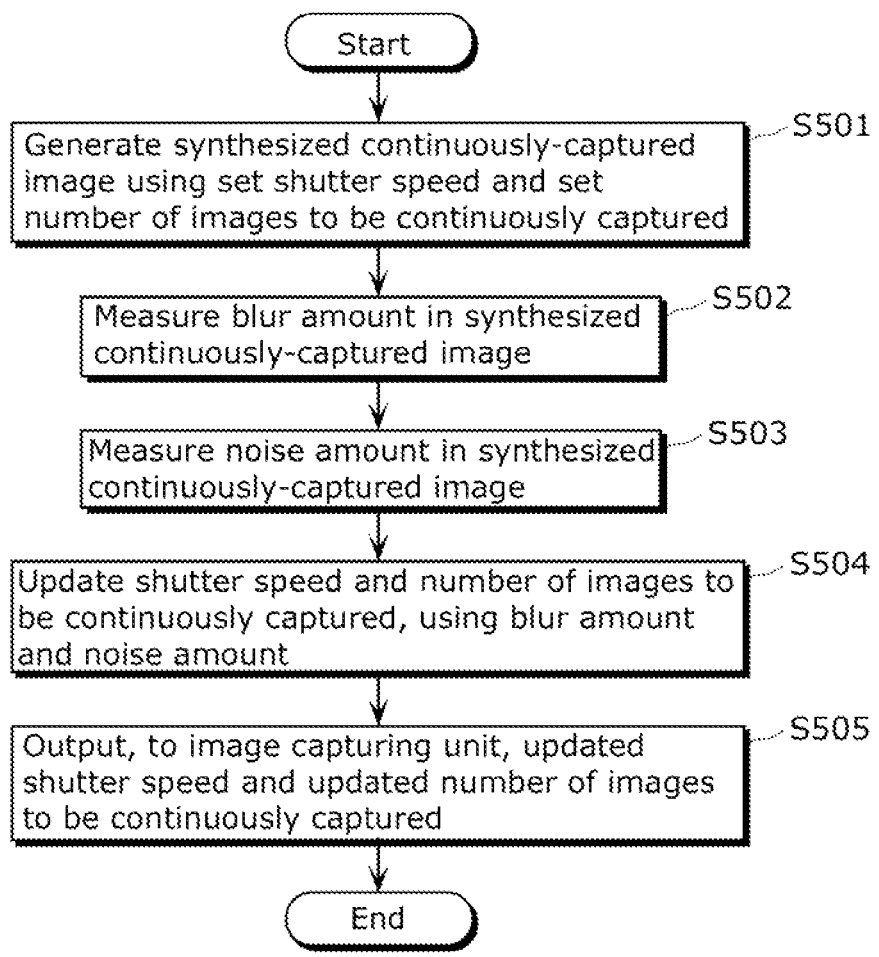
FIG. 16 is a flowchart of an image capturing device according to Embodiment 4 of the present invention.

FIG. 16 is a process flow of a method for updating the shutter speed and the number of images to be continuously captured, according to Embodiment 4.

As a precondition, it is assumed that the total exposure time in the continuous capturing of images and synthesizing of the continuously-captured images is fixed.

In Step S501, the continuous capturing of images and synthesizing of the continuously-captured images is performed using the shutter speed and the number of images to be continuously captured which are currently set in the image capturing unit 101. With this, the continuously-captured-image synthesizing unit 107 generates a synthesized continuously-captured image.

Note that in the case where the shutter speed and the number of images to be continuously captured are not initially set, the image capturing is performed using an initial shutter speed and an initial number of images to be continuously captured which are set by the user setting unit 204.

In Step S502, the blur amount calculating unit 108 measures the blur amount in the synthesized continuously-captured image obtained from the continuously-captured-image synthesizing unit 107.

As the blur amount to be measured, a blur degree of the object in the synthesized continuously-captured image can be used, for example.

The blur degree to be used is measured using a typical method of blind deconvolution, for example.

Such a blur amount is dependent on the speed of the object; the faster the speed of the object, the larger the blur amount.

In Step S503, the noise amount calculating unit 109 measures the noise amount in the synthesized continuously-captured image obtained from the continuously-captured-image synthesizing unit 107.

The noise amount may be obtained from a variance value and an average value of a flat portion of the synthesized continuously-captured image, for example.

For example, from the average value of the flat portion, a variance value of optical shot noise in relation to the average value is calculated and a measured variance value is divided by the variance value of the optical shot noise, to obtain, as the noise amount, a ratio of dark current noise in the synthesized continuously-captured image.

Note that as the flat portion of the image, a variance value of a given rectangular region is measured for the entire object region, so that a region having the smallest value can be determined and used.

Such a noise amount is dependent on the luminance value of the object; the smaller the luminance value, the larger the noise amount.

In Step S504, the continuous-capturing parameter calculating unit 106 updates the shutter speed and the number of images to be continuously captured, using the blur amount and the noise amount obtained in Step S502 and Step S503, respectively.

The shutter speed and the number of images to be continuously captured are updated such that an evaluation value calculated from the blur amount and the noise amount decreases.

The evaluation value can be calculated by multiplying the blur amount by a weight and multiplying the noise amount by a different weight, and obtaining a maximum value of the two resulting values: the value resulted from the blur amount multiplication, and the value resulted from the noise amount multiplication.

A case will be described where it is assumed that the blur amount is B, the noise amount is N, the weight for the blur amount is W1, and the weight for the noise amount is W2, for example.

The product of the blur amount B and the weight W1 is W1·B, while the product of the noise amount N and the weight W2 is W2·N.

Here, the magnitude relationship between W1·B and W2·N is evaluated, and a larger one of W1·B and W2·N is determined as the evaluation value.

When W1·B is determined as the evaluation value, the currently-set shutter speed is increased by one step and the number of images to be continuously captured is increased according to such a one-step increase, in order to decrease the evaluation value. By doing so, it is possible to reduce the blur in the synthesized continuously-captured image and decrease the value of W1·B.

When W2·N is determined as the evaluation value, the currently-set shutter speed is decreased by one step and the number of images to be continuously captured is decreased according to such a one-step decrease, in order to decrease the evaluation value. By doing so, it is possible to reduce the noise amount in the synthesized continuously-captured image and decrease the value of W2·N.

As the values of the weights W1 and W2 of the blur amount and the noise amount, values set by the user via the user setting unit 204 are used, for example.

As the method for calculating the weights, a calculation method using a synthesized continuously-captured image captured in advance can be used.

For example, among a plurality of synthesized continuously-captured images each of which has been captured using one of a plurality of pairs (a plurality of pairs of the shutter speed and the number of images to be continuously captured), a synthesized continuously-captured image having the highest resolution is determined, and the blur amount B and the noise amount N of the synthesized continuously-captured image having the highest resolution are obtained, so that W1 and W2 satisfying W1·B=W2·N can be calculated.

In Step S505, the shutter speed and the number of images to be continuously captured which are determined in Step S504, are outputted to the camera parameter setting unit 209.

The process according to the present embodiment is repeated to update the shutter speed and the number of images to be continuously captured, so that a pair of the shutter speed (shutter speed at the intersection of the solid line and the dashed line in FIG. 9) and the number of images to be continuously captured is set which makes the effect of the deterioration in resolution caused by blur and the effect of the deterioration in resolution caused by noise comparable to each other, thereby producing a synthesized continuously-captured image having a high resolution and a high sensitivity.

Moreover, even when the luminance value and the speed of the object change with time, an optimal shutter speed and an optimal number of images to be continuously captured are updated according to such changes, and thus this is suitable for consecutively performing the continuous capturing of images and synthesizing of the continuously-captured images.

FIG. 17 shows the image capturing device 100.

The image capturing device 100 includes the parameter setting unit 205, an image capturing unit 203, and the continuously-captured-image synthesizing unit 107.

The parameter setting unit 205 receives information indicating a luminance value (luminance value information) 205a and information pertaining a relative speed of the object (relative speed information) 205v.

The parameter setting unit 205 outputs information 205b indicating a shutter speed identified from the received information 205a and information 205v.

The parameter setting unit 205 also outputs information 205n indicating the number of images to be continuously captured which corresponds to the identified shutter speed.

The image capturing unit 203 continuously captures, at the shutter speed indicated in the outputted information 205b, each of images to be continuously captured, the number of which is indicated in the outputted information 205n.

Each of continuously-captured images is an image in which the object 101x is captured.

The continuously-captured-image synthesizing unit 107 generates, from the continuously-captured images the number of which is determined in the above-described manner, an image (synthesized continuously-captured image) 93a in which the object 101x is captured.

In such a manner, the following operation may be performed at one stage, for example.

Specifically, the object 101x is captured through an image capturing operation 203x, and a first image 93a including an image 93m of the object 101x is generated. The image 93m included in the generated first image 93a may have blur.

In view of the above, a second image 92a including an image 92m of the object 101x is captured with a second time length of exposure. That is to say, an image including the image of the object 101x is not captured with a first time length of exposure which is longer than the second time length. This makes the blur (blur 92p) of the image 92m of the object 101x in the second image 92a smaller than the blur of the image of the object 101x in the image captured with the first time length of exposure.

Here, the first time length is, for example, a sum of the second time lengths of the respective ones of a plurality of second images 92a captured.

That is to say, a plurality of such second images 92a are captured. More specifically, the plurality of second images 92a are continuously-captured images of the object 101x.

The first image 93a is generated from the captured second images 92a. Since the blur in each of the continuously-captured images (the second images 92a) is smaller, the blur in the synthesized image (the first image 93a) is also smaller. That is to say, the blur in the first image 93a is smaller than the blur in the image captured with the first time length of exposure.

Here, in a first case where the object 101x is irradiated with relatively strong light 91a and is thus illuminated relatively brightly, it is considered that adequate continuously-captured images can be produced and that the image quality (e.g. resolution) of the first image 93a generated from the second images 92a is high.

However, in a second case where the object 101x is irradiated with relatively weak light 91b instead of the relatively strong light 91a, and is thus not illuminated relatively brightly, it is considered that adequate continuously-captured images cannot be produced and that the image quality of the first image 93a generated from the second images 92a is not high.

In other words, in the first case, the pixel values of the image 92m of the object 101x in each of the second images 92a are higher, which makes the relative noise level of the second images 92a (ratio of noise to the pixel values) lower and the relative noise amount smaller. Therefore, the image quality of the first image 93a generated from the second images 92a increases.

Conversely, in the second case, the pixel values of the image 92m of the object 101x are lower, which makes the relative noise level higher and the relative noise amount larger, and therefore, the image quality of the first image 93a decreases.

In view of the above, the luminance value information 205a (see the data 102d in FIG. 1, Step S101 in FIG. 2, and so on) indicating whether or not the object 101x is irradiated with the strong light 91a may be obtained.

Note that the obtained luminance value information 205a may indicate, for example, whether or not the luminance value of the image 92m in each of the second images 92a is higher than a threshold. When indicating that the luminance value is higher than the threshold, the luminance value information 205a may indicate that the object 101x is irradiated with the strong light 91a, whereas when not indicating that the luminance value is higher than the threshold, the luminance value information 205a may indicate that the object 101x is not irradiated with the strong light 91a.

Only when the obtained luminance value information 205a indicates that the object 101x is irradiated with the strong light 91a, the first image 93a is generated from the captured second images 92a.

Conversely, when it is indicated that the object 101x is not irradiated with the strong light 91a, the first image 93a may be generated from a plurality of third images 92b.

Here, each of the third images 92b is an image which includes an image 92n of the object 101x and is captured with a third time length of exposure (time length when the shutter speed is L2 shown in FIG. 9) longer than the second time length (e.g. a time length when the shutter speed is L1 shown in FIG. 9).

The image quality of the image generated from the third images 92b (see the resolution value X3 in FIG. 9, the relatively high resolution of the image in the middle column in FIG. 6, and so on) becomes relatively higher also in the above-described dark second case (see the resolution value X2 when the shutter speed is L1, which is lower than the resolution value X3, see the relatively low resolution of the image in the left column in FIG. 6, and so on).

That is to say, the first image 93a is generated using the second images 92a in the brighter first case, whereas the first image 93a is generated using the third images 92b in the darker second case. This allows an adequate image to be generated in any case.

Furthermore, the exposure time (shutter speed) in capturing the third images 92b in the second case is an optimal exposure time identified from the luminance value information 205a and the relative speed information 205v of the object described above. Thus, the generated image can also have a sufficient resolution.

[Other Variations]

Although the present invention has been described based on the above embodiments, the present invention is not to be limited by such embodiments. The present invention also includes such cases as below.

(1) The above image capturing device is specifically a computer system including a microprocessor, a read-only memory (ROM), a random-access memory (RAM), a hard disk unit, a display unit, a keyboard, a mouse, and so on. A computer program is stored in the RAM or the hard disk unit. The image capturing device achieves its functions through the microprocessor's operation according to the computer program. Here, the computer program is a combination of a plurality of instruction codes indicating instructions for the computer, so that a predetermined function is achieved.

(2) Part or all of the structural elements of the image capturing device may be configured from a single system large-scale integrated (LSI) circuit. The system LSI is a super-multifunction LSI manufactured by integrating a plurality of structural units on a single chip, and is specifically a computer system including a microprocessor, a ROM, a RAM, and so on. A computer program is stored in the RAM. The system LSI achieves its function through the microprocessor's operation according to the computer program.

(3) Part or all of the structural elements of the image capturing device may be configured as an integrated circuit (IC) card attachable to the image capturing device or as a stand-alone module. The IC card or the module is a computer system including a microprocessor, a ROM, a RAM, and so on. The IC card or the module may include the aforementioned super-multifunction LSI. The IC card or the module achieves its function through the microprocessor's operation according to the computer program. The IC card or the module may be tamper-resistant.

(4) The present invention may be realized as the methods described above. In addition, the present invention may be a computer program for realizing such methods using a computer, and may also be a digital signal including the computer program.

Moreover, the present invention may also be realized by storing the computer program or the digital signal in a computer-readable recording medium such as a flexible disc, a hard disk, a CD-ROM, a magneto-optical (MO) disk, a digital versatile disc (DVD), a digital versatile disc read-only memory (DVD-ROM), a digital versatile disc random-access memory (DVD-RAM), a Blu-ray disc (BD), and a semiconductor memory. Furthermore, the present invention may also be realized as the digital signal recorded on these recording media.

In addition, the present invention may also be realized by transmission of the computer program or the digital signal via a telecommunication line, a wireless or wired communication line, a network represented by the Internet, a data broadcast, and so on.

Moreover, the present invention may also be a computer system including a microprocessor and a memory, in which the memory stores the computer program and the microprocessor operates according to the computer program.

Furthermore, by transferring the program or the digital signal recorded onto the recording media, or by transferring the program or the digital signal via the network and the like, implementation using another independent computer system is also possible.

(5) It is also possible to combine the above embodiments and variations.

INDUSTRIAL APPLICABILITY

The present invention can be commercially, continuously, and repetitively used in the manufacturing and sales industries for image capturing devices or information processing devices which perform image processing.

With an image capturing device according to an aspect of the present invention, crime prevention is expected to strengthen because a security camera, a monitoring camera, and the like can produce a high resolution image even in a scene in which a person and/or a car pass by in a very short length of time. Note that as in the case of digital still cameras and digital video cameras, there is a possibility for the present invention to be used by general consumers in various scenes.

REFERENCE SIGNS LIST

101 Image capturing unit
102 Luminance value calculating unit
103 Speed calculating unit
104 Speed resolution database
105 Luminance value resolution database
106 Continuous-capturing parameter calculating unit
107 Continuously-captured-image synthesizing unit
108 Parameter setting unit
108 Blur amount calculating unit
109 Noise amount calculating unit
201 Lens
202 Diaphragm
203 Imaging sensor unit
204 User setting unit
206 Temperature sensor
207 Camera data holding unit
209 Camera parameter setting unit

The invention claimed is:

1. An image capturing device comprising:
an image capturing unit configured to receive light from an object and generate an image in which the object is captured;
a continuously-captured-image synthesizing unit configured to generate a synthesized continuously-captured image in which the object is captured, by synthesizing two or more images temporally continuously captured by the image capturing unit; and a parameter setting unit configured to set a shutter speed at which each of the two or more images is captured, according to a luminance value of the object and a speed of the object,
wherein the parameter setting unit is configured to set the shutter speed such that a degree of deterioration in resolution of the synthesized continuously-captured image caused by blur and a degree of deterioration in resolution of the synthesized continuously-captured image caused by noise are comparable to each other.

2. The image capturing device according to claim 1,
wherein the parameter setting unit is configured to set the shutter speed and the number of images to be captured, according to the luminance value of the object and the speed of the object.

3. The image capturing device according to claim 2,
wherein as the speed of the object relative to the image capturing device increases, the parameter setting unit is configured to set a faster shutter speed as the shutter speed and a larger number as the number of images to be captured.

4. The image capturing device according to claim 2,
wherein as the luminance value of the object decreases, the parameter setting unit is configured to set a slower shutter speed as the shutter speed and a smaller number as the number of images to be captured.

5. The image capturing device according to claim 2,
wherein the image capturing unit includes a user setting unit configured to allow setting of a total exposure time before each of the images is captured, and
the set number of images to be captured is a number that makes a product of the set number and the set shutter speed coincide with the total exposure time set by the user setting unit.

6. The image capturing device according to claim 1, further comprising:
a speed resolution database indicating a relationship between an amount of the blur and the degree of deterioration in resolution caused by the blur, the amount of the blur being dependent on the speed of the object; and
a luminance value resolution database indicating a relationship between an amount of the noise and the degree of deterioration in resolution caused by the noise, the amount of the noise being dependent on the luminance value of the object.

7. The image capturing device according to claim 1,
wherein the parameter setting unit is configured to generate, from first data which exists in a speed resolution database and indicates the degree of deterioration in resolution caused by the blur in a first blur amount, second data which does not exist in the speed resolution database and indicates the degree of deterioration in resolution caused by the blur in a second blur amount, the first blur amount being dependent on a first speed of the object, and the second blur amount being dependent on a second speed of the object.

8. The image capturing device according to claim 1,
wherein the parameter setting unit is configured to generate, from first data which exists in a luminance value resolution database and indicates the degree of deterioration in resolution caused by the noise in a first noise amount, second data which does not exist in the luminance value resolution database and indicates the degree of deterioration in resolution caused by the noise in a second noise amount, the first noise amount being dependent on a first luminance value of the object, and the second noise amount being dependent on a second luminance value of the object.

9. The image capturing device according to claim 6,
wherein the speed resolution database stores a speed resolution table indicating a measured relationship between the shutter speed and the resolution at each of speeds of the object, and
the luminance value resolution database stores a luminance value resolution table indicating a measured relationship between the shutter speed and the resolution at each of luminance values of the object.

10. The image capturing device according to claim 6,
wherein the shutter speed is set such that the resolution associated with the shutter speed by the relationship indicated in the speed resolution database coincides with the resolution associated with the shutter speed by the relationship indicated in the luminance value resolution database.

11. The image capturing device according to claim 5,
wherein the shutter speed is set based on an image capturing condition, and
the image capturing condition includes at least one of an identification number of a lens, an identification number of an imaging sensor, an f number, and a temperature.

12. An image capturing method comprising:
receiving light from an object and generating an image in which the object is captured;
generating a synthesized continuously-captured image in which the object is captured, by synthesizing two or more images temporally continuously captured in the receiving; and
setting a shutter speed at which each of the two or more images is captured, according to a luminance value of the object and a speed of the object,
wherein in the setting, the shutter speed is set such that a degree of deterioration in resolution of the synthesized continuously-captured image caused by blur and a degree of deterioration in resolution of the synthesized continuously-captured image caused by noise are comparable to each other.

* * * * *